United States Patent
Ito et al.

(10) Patent No.: US 10,268,068 B2
(45) Date of Patent: Apr. 23, 2019

(54) ELECTROOPTICAL DEVICE, ELECTRONIC APPARATUS, AND METHOD FOR MANUFACTURING ELECTROOPTICAL DEVICE

(71) Applicant: SEIKO EPSON CORPORATION, Tokyo (JP)

(72) Inventors: Satoshi Ito, Eniwa (JP); Yoshitake Tateno, Chitose (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/830,848

(22) Filed: Dec. 4, 2017

(65) Prior Publication Data

US 2018/0173048 A1  Jun. 21, 2018

(30) Foreign Application Priority Data

Dec. 19, 2016 (JP) ................................. 2016-245135

(51) Int. Cl.
*G02F 1/133* (2006.01)
*G02F 1/1333* (2006.01)
(Continued)

(52) U.S. Cl.
CPC ...... *G02F 1/133526* (2013.01); *G02F 1/1368* (2013.01); *G02F 1/13306* (2013.01); *G02F 1/13394* (2013.01); *G02F 1/13452* (2013.01); *G02F 1/1343* (2013.01); *G02F 1/134309* (2013.01); *G02F 1/136209* (2013.01); *G02F 2001/133388* (2013.01); *G02F 2201/121* (2013.01); *G02F 2201/123* (2013.01); *G02F 2201/50* (2013.01)

(58) Field of Classification Search
CPC .......... G02F 1/133526; G02F 1/13306; G02F 1/13394
See application file for complete search history.

(56) References Cited

U.S. PATENT DOCUMENTS

| | | | |
|---|---|---|---|
| 5,764,318 A | 6/1998 | Kurematsu et al. | |
| 2002/0021386 A1* | 2/2002 | Yotsuya | G02B 3/0025 349/95 |

(Continued)

FOREIGN PATENT DOCUMENTS

| | | |
|---|---|---|
| JP | H06-202096 A | 7/1994 |
| JP | 2000-030517 A | 1/2000 |

(Continued)

*Primary Examiner* — Lucy P Chien
(74) *Attorney, Agent, or Firm* — Oliff PLC

(57) ABSTRACT

There is provided an a electrooptical device which includes a electrooptical layer and an element substrate, in which the counter substrate includes a lens layer disposed on the electrooptical layer side of the lens layer, the element substrate includes a lens layer disposed on a substrate, a TFT that is provided on the electrooptical layer side of the lens layer, a light shielding portion that includes an opening for each of the pixels and is provided on the electrooptical layer side so as to overlap with the TFT, the lens layer is provided so as to fill a recess formed in a first region of a surface of the substrate and a recess formed at the bottom of the recess, and a surface of the lens layer constitutes a plane continuous with a surface in a second region of the substrate.

12 Claims, 14 Drawing Sheets

(51) Int. Cl.
  *G02F 1/1339* (2006.01)
  *G02F 1/1343* (2006.01)
  *G02F 1/1345* (2006.01)
  *G02F 1/1362* (2006.01)
  *G02F 1/1368* (2006.01)
  *G02F 1/1335* (2006.01)

(56) References Cited

U.S. PATENT DOCUMENTS

| | | | |
|---|---|---|---|
| 2008/0173043 A1 | 7/2008 | Kaart | |
| 2015/0002790 A1* | 1/2015 | Ito | G02F 1/133526 349/95 |
| 2015/0041833 A1* | 2/2015 | Nimura | H01L 27/1214 257/88 |

FOREIGN PATENT DOCUMENTS

| | | |
|---|---|---|
| JP | 2001-059963 A | 3/2001 |
| JP | 2016-075797 A | 5/2016 |

\* cited by examiner

ELECTROOPTICAL DEVICE, ELECTRONIC APPARATUS, AND METHOD FOR MANUFACTURING ELECTROOPTICAL DEVICE

BACKGROUND

1. Technical Field

The present invention relates to an electrooptical device, an electronic apparatus, and a method for manufacturing an electrooptical device.

2. Related Art

An electrooptical device including electrooptical substances, for example, liquid crystals between an element substrate and a counter substrate has been known. An example of the electrooptical device includes a liquid crystal device used as a liquid crystal light bulb of a projector. In the liquid crystal device, since a light shielding portion is provided in a region where a switching element or wirings of the element substrate are disposed, some incident light is shielded by the light shielding portion and is not used. In addition, when the light emitted from the liquid crystal device spreads, an area other than the effective projection area of a projection lens of the projector is irradiated with a part of the emitted light and the light is not used. Therefore, a configuration for improving the utilization efficiency of light in the liquid crystal device by providing microlenses in both the element substrate and the counter substrate is known (for example, see JP-A-2016-75797).

In the liquid crystal device described in JP-A-2016-75797, light incident on the liquid crystal device from a counter substrate is concentrated to an opening between a light shielding portion and a light shielding portion by a first microlens and a second microlens provided in the counter substrate and is transmitted through the liquid crystal layer (electrooptical layer). Then, by a third microlens provided in the element substrate, light is emitted from the liquid crystal device by suppressing the spread of light transmitted through the liquid crystal layer. In this way, it possible to improve the utilization efficiency of light without increasing the diameter of the projection lens.

In general, processing of element substrates is performed in a state of a large mother substrate capable of taking a plurality of element substrates, and switching elements are formed by a semiconductor process after formation of the third microlens. In the liquid crystal device described in JP-A-2016-75797, in the element substrate, a third lens layer constituting the third microlens is formed so as to fill a recess which becomes a surface of the third lens surface and to cover the surface of the element substrate. Therefore, the thickness of the third lens layer covering the surface of the mother substrate is different between a region where the third lens surface is disposed in the plane of the mother substrate and the other regions. When such a mother substrate is exposed to a high temperature in a step of performing a heat treatment such as a semiconductor process, by the stress generated in the third lens layer due to the difference in the thickness of the third lens layer in the plane of the mother substrate or the difference in a thermal expansion coefficient between the element substrate and the third lens layer, cracks and warpage of the third lens layer may be generated, and there is a possibility that yield in the manufacturing step of the liquid crystal device may be lowered.

On the other hand, a method in which the third lens layer is divided for each third microlens (that is, for each pixel) to relieve the stress is conceivable, but in this case, since the lens diameter of the third microlens becomes smaller than the arrangement pitch of the pixels, among the light beams transmitted through the liquid crystal layer, by the light emitted without being incident on the third microlens and the light greatly bent at the outer peripheral end portion of the surface of the third lens at which the angle with respect to the surface of the element substrate is close to a right angle, a quantity of oblique light increases. As a result, the spread of the light emitted from the liquid crystal device becomes large, which causes a problem that light utilization efficiency and contrast of the projector are lowered.

SUMMARY

The invention can be realized in the following aspects or application examples.

Application Example 1

According to this application, there is provided an electrooptical device which includes a first substrate and a second substrate on which a plurality of pixels are disposed and an electrooptical layer that is sandwiched therebetween, in which light is incident on the electrooptical layer from the first substrate, the first substrate includes a first lens layer that has a first microlens disposed on a first base material for each of the pixels, and a second lens layer that has a second microlens disposed on the electrooptical layer side of the first lens layer for each of the pixels, the second substrate includes a third lens layer that has a third microlens disposed on a second base material for each of the pixels, a switching element that is provided for each pixel on the electrooptical layer side of the third lens layer, and a light shielding portion that has an opening for each pixel and is provided on the electrooptical layer side of the switching element so as to overlap with the switching element in a plan view, the third lens layer is provided so as to fill a first recess that is formed in a first region in which the plurality of pixels on one surface of the second substrate on the electrooptical layer side are disposed and a second recess that constitutes a lens surface of the third microlens that is formed at a bottom of the first recess, and the surface on the one surface side of the third lens layer constitutes a plane continuous with the one surface in the second region that is disposed outside the first region of the second base material.

According to the configuration of the application example, since the light incident on the electrooptical device from the first substrate is concentrated on the opening of the pixel by the first microlens and the second microlens provided on the first substrate, the amount of light transmitted through the electrooptical layer may be increased without being shielded by the light shielding portion. Then, since the spread of the light transmitted through the electrooptical layer is suppressed and emitted from the liquid crystal device by the third memory provided in the second substrate, the utilization efficiency of light may be improved.

Here, on the second substrate on which the switching element is provided, the first recess is formed in the first region on the second base material on which a plurality of pixels are disposed, and the second recess constituting the lens surface of the third microlens is formed at the bottom of the first recess. Then, the surface of the third lens layer provided so as to fill the first recess and the second recess in the first region and the surface of the second base material in the second region disposed outside the first region constitute a continuous plane. That is, the third lens layer is disposed in the first region of the second base material, but is not disposed in the second region. Therefore, in the state of large mother substrate capable of taking a plurality of second substrates, the third lens layer is divided in a unit of the second substrate. Therefore, even if the second substrate is exposed to a high temperature in a semiconductor process or the like after the third microlens is formed in the state of the mother substrate, the stress generated in the third lens layer is smaller compared with the case where the third lens layer is formed on the entire surface of the second substrate. Therefore, since it is possible to suppress the generation of cracks and warpage of the third lens layer in the process of performing a heat treatment such as a semiconductor process, it is possible to improve the yield in the manufacturing step of the liquid crystal device.

In addition, since the third lens layer is divided in a unit of the second substrate, there is no need to divide the third lens layer for each of the third microlenses (that is, each of the pixels). Accordingly, since the adjacent third microlenses (the second recesses) may be connected to each other, it is possible to increase the lens diameter of the third microlens compared with the case where the third lens layer is divided for each of the third microlenses. In this way, since the region where the third microlens is not disposed in the region of each pixel is reduced, more light transmitted through the electrooptical layer may be incident on the third microlense. Then, since the adjacent second recesses are connected to each other and the angle of the outer peripheral end portion of the lens surface of the third microlens with respect to the surface of the second substrate is reduced, it is possible to reduce the bending angle of light by the third microlens. As a result, since the spread of the light emitted from the liquid crystal device is suppressed, it is possible to improve the utilization efficiency of light and improve the contrast in the projector.

Application Example 2

In the electrooptical device according to the above application example, it is preferable that a refractive index of the third lens layer be larger than a refractive index of the second base material and smaller than refractive indices of the first lens layer and the second lens layer.

According to the configuration of the application example, the refractive index of the third lens layer constituting the third microlense is larger than the refractive index of the second base material and smaller than the refractive index of the first lens layer constituting the first microlens and the second lens layer constituting the second microlens. Therefore, it is possible to further reduce the bending angle (refraction angle) of the light concentrated by the first microlens and the second microlens and transmitted through the electrooptical layer and incident on the third microlens. As a result, since the variation in the angle of the light emitted from the electrooptical device is suppressed, the contrast of an image to be projected may be improved.

Application Example 3

In the electrooptical device according to the above application example, it is preferable that the refractive index of the third lens layer be 1.51 or more and 1.60 or less, and the refractive index of the first lens layer and the second lens layer be 1.55 or more and 1.70 or less.

According to the configuration of the application example, by setting the refractive index of the first lens layer, the second lens layer, and the third lens layer within the above ranges, it is possible to achieve both improvement of light utilization efficiency and improvement of contrast.

Application Example 4

In the electrooptical device according to the above application example, it is preferable that at least a part of the third microlens be in contact with the adjacent third microlenses.

According to the configuration of the application example, at least a part of the adjacent third microlenses are in contact with each other. That is, the adjacent third microlenses (second recesses) are connected to each other. Therefore, compared with the case where the third lens layer is divided for each of the third microlenses, the lens diameter of the third microlens with respect to the arrangement pitch of the pixel may be increased. In this way, since the region where the third microlens is not disposed in the region of each pixel is reduced, more light transmitted through the electrooptical layer may be incident on the third microlens. In this way, it is possible to set the refractive index of the third lens layer to be small.

Application Example 5

In the electrooptical device according to the above application example, it is preferable that a lens diameter of the third microlens be 85% or more and 110% or less of a length of a diagonal line of the pixel.

According to the configuration of the application example, since the lens diameter may be made larger than the arrangement pitch of the pixel by setting the lens diameter to 85% or more of the length of the diagonal line of the pixel, the adjacent third microlenses may be connected to each other in the direction along each of the two mutually intersecting sides of the pixel having a rectangular shape. Therefore, the region where light is not incident on the third microlens of the opening of the pixel may be made small. By setting the lens diameter to 110% or less of the length of the diagonal line of the pixel, it is possible to prevent the effective portion for bending back the light incident on the third microlens toward the center side of the microlens ML3 from becoming small relative to the opening of the pixel.

Application Example 6

According to this application example, there is provided an electronic apparatus including the electrooptical device of the above application examples.

According to the configuration of the application example, since the electrooptical device capable of improving the utilization efficiency of light and contrast is provided, it is possible to provide the electronic apparatus capable of projecting an image with high brightness and high display quality.

Application Example 7

According to this application example, there is provided a method for manufacturing an electrooptical device which includes a first substrate and a second substrate on which a plurality of pixels are disposed and an electrooptical layer sandwiched therebetween, and in which light is incident on the electrooptical layer from the first substrate, the method including: forming a recess on one surface of a first base material of the first substrate for each of the pixels; forming a first lens layer so as to cover the one surface of the first base material to fill the recess; flattening a surface of the first lens layer; forming a second lens layer on the first lens layer; forming a projection for each of the pixels by selectively removing a surface of the second lens layer; forming a first recess in a first region in which the plurality of pixels on one substrate of the second base material of the second substrate are disposed; forming a second recess at a bottom of the first recess for each of the pixels; forming a third lens layer so as to cover the one surface of the second base material to fill the first recess and the second recess; flattening a surface of the third lens layer in the first region and a surface of the second base material in the second region to be a continuous plane by removing the surface of the third lens layer until the second base material is exposed in a second region disposed outside the first region; forming a switching element on the third lens layer for each of the pixels; forming a light shielding portion having an opening for each of the pixels on the switching element and being provided so as to overlap with the switching element in a plan view, and bonding a surface of the first substrate on which the second lens layer is formed and a surface of the second substrate on which the light shielding portion is formed with the electrooptical layer interposed therebetween.

According to the manufacturing method of the application example, the first microlens is configured by filling the recess formed on one surface of the first base material of the first substrate by the first lens layer, and the second microlens is configured by forming the projection on the surface of the second lens layer. Then, the third microlens is configured by filling the second recess formed on one surface of the second base material of the second substrate by the third lens layer. In this way, by concentrating the light incident on the electrooptical device from the first substrate into the opening of the pixel by the first microlens and the second microlens and suppressing the spread of the light transmitted through the electrooptical layer by the third microlens and emitting the light, it is possible to manufacture the electrooptical device whose light utilization efficiency improves.

Here, in the step of flattening the surface of the third lens layer, from the third lens layer covering one surface of the second base material to fill the first recess and the second recess formed at the bottom of the first recess, a part covering one surface of the second base material in the second region disposed outside the first region is removed. Therefore, in a case of processing in the state of the large mother substrate capable of taking a plurality of second substrates, the switching element is formed after the third lens layer is divided in a unit of the second substrate unit. Therefore, even if the second substrate is exposed to a high temperature in a semiconductor process or the like, the stress generated in the third lens layer is smaller compared with the case where the third lens layer is formed on the entire surface of the second substrate. Therefore, it is possible to suppress generation of cracks and warpage in the third lens layer in a step of performing a heat treatment such as a semiconductor process.

In addition, since the adjacent third microlenses (the second recesses) may be connected to each other because the third lens layer is divided in a unit of the second substrate, it is possible to increase the lens diameter of the third microlens compared with the case where the third lens layer is divided for each of the third microlenses. As a result, since more of the light transmitted through the electrooptical layer is incident on the third microlens, thus the spread of light emitted from the electrooptical device may be suppressed. As compared with the case where the third lens layer is divided for each of the third microlenses, more light is incident on the third microlens, thus the refractive index of the third lens layer may be reduced. As a result, it is possible to improve light utilization efficiency and contrast.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings. The drawings used here are displayed to be appropriately enlarged or contracted so that the described part is recognizable. Parts other than constituent elements necessary for the description may be omitted.

In the following aspects, the expression "on a substrate", for example, indicates a case where a component is disposed to be in contact with the upper portion of the substrate, a case where a component is disposed on the substrate with another component interposed therebetween, or a case where a part of a component is disposed to be in contact with the upper portion of the substrate and another part of the component is disposed on the substrate with another component interposed therebetween.

First Embodiment

Electrooptical Device

In a first embodiment, an active matrix type liquid crystal device including a thin film transistor (TFT) as a switching element of a pixel will be described as an example of an electrooptical device. This liquid crystal device, for example, may be suitably used as an optical modulation element (liquid crystal light bulb) of a projection type display apparatus (projector) which will be described later.

Figure 1:
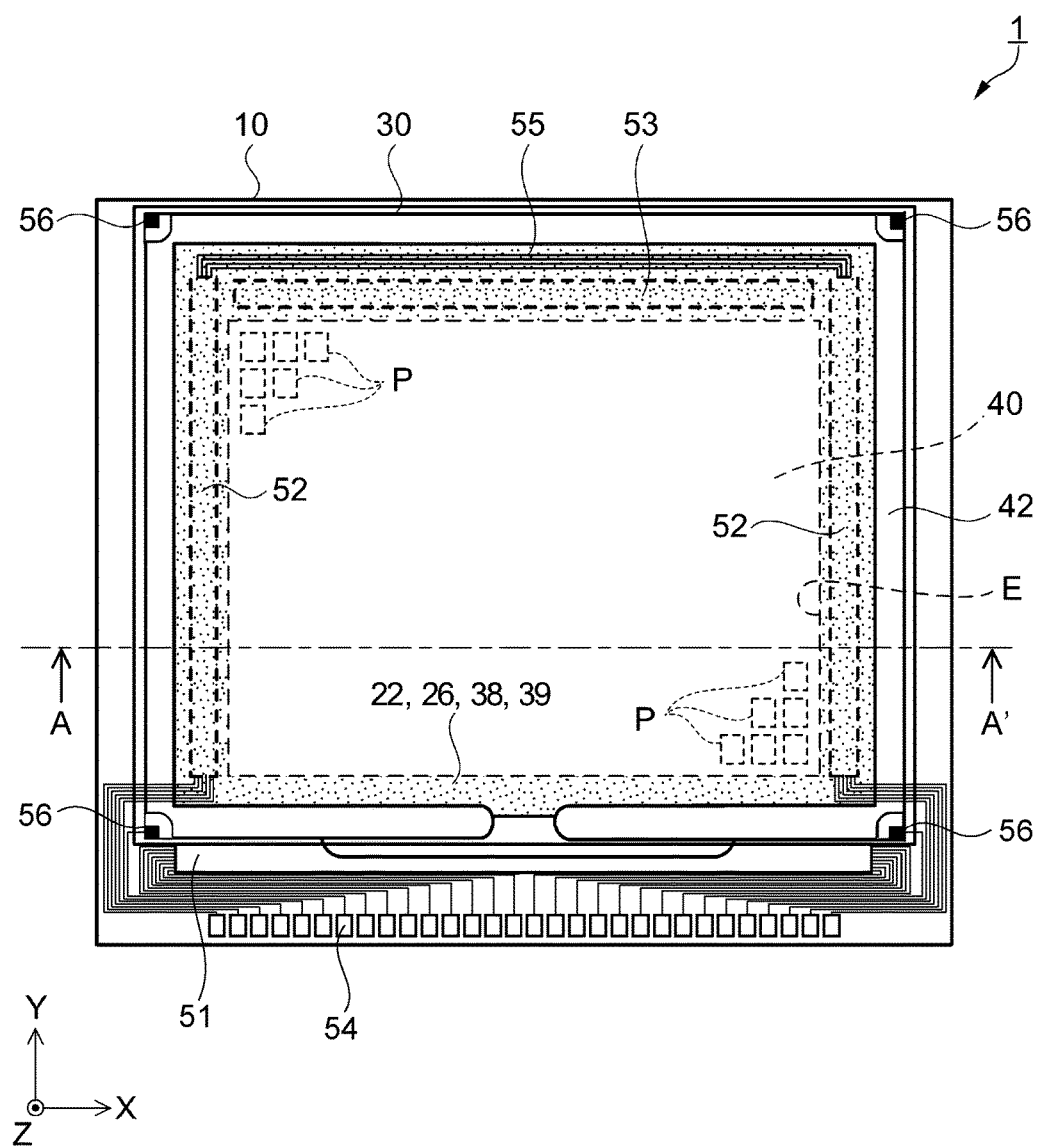
FIG. 1 is a schematic plan view showing a configuration of a liquid crystal device according to a first embodiment.
Figure 2:
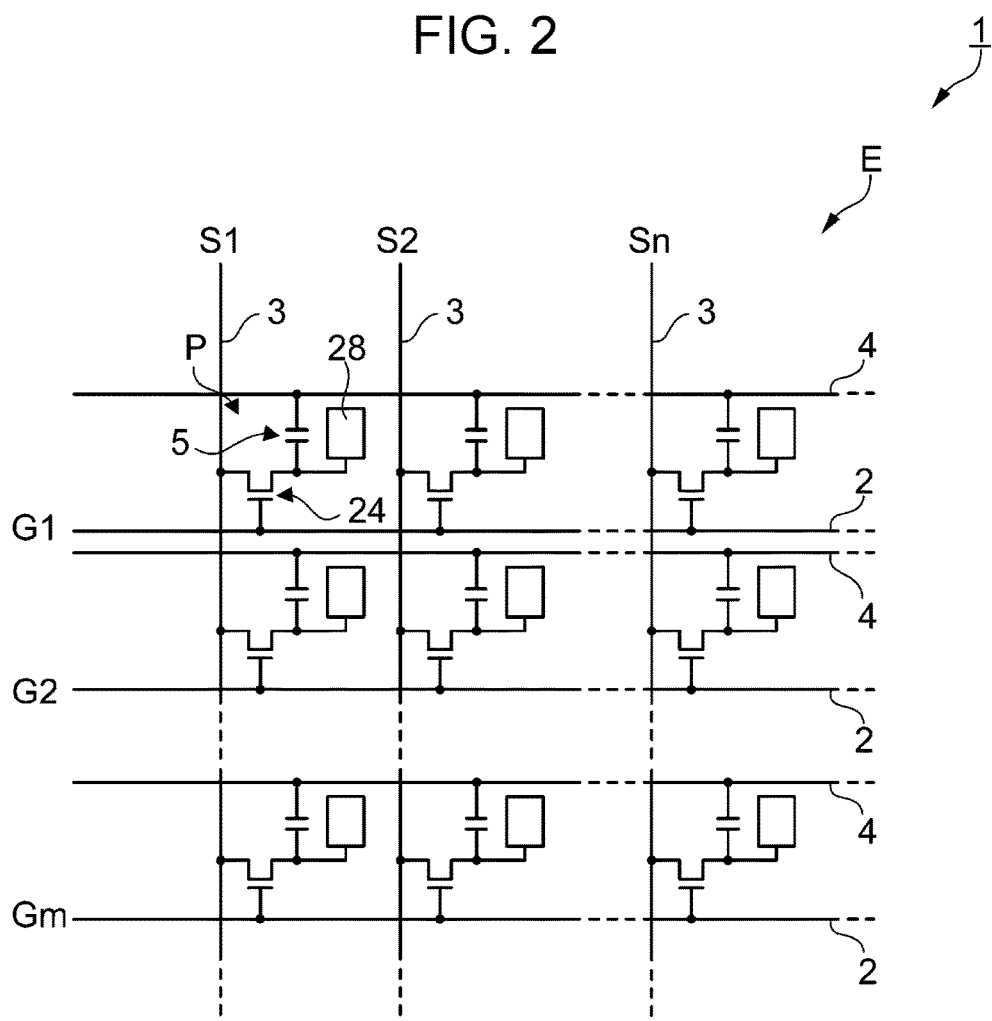
FIG. 2 is an equivalent circuit diagram showing an electrical configuration of the liquid crystal device according to the first embodiment.
Figure 3:
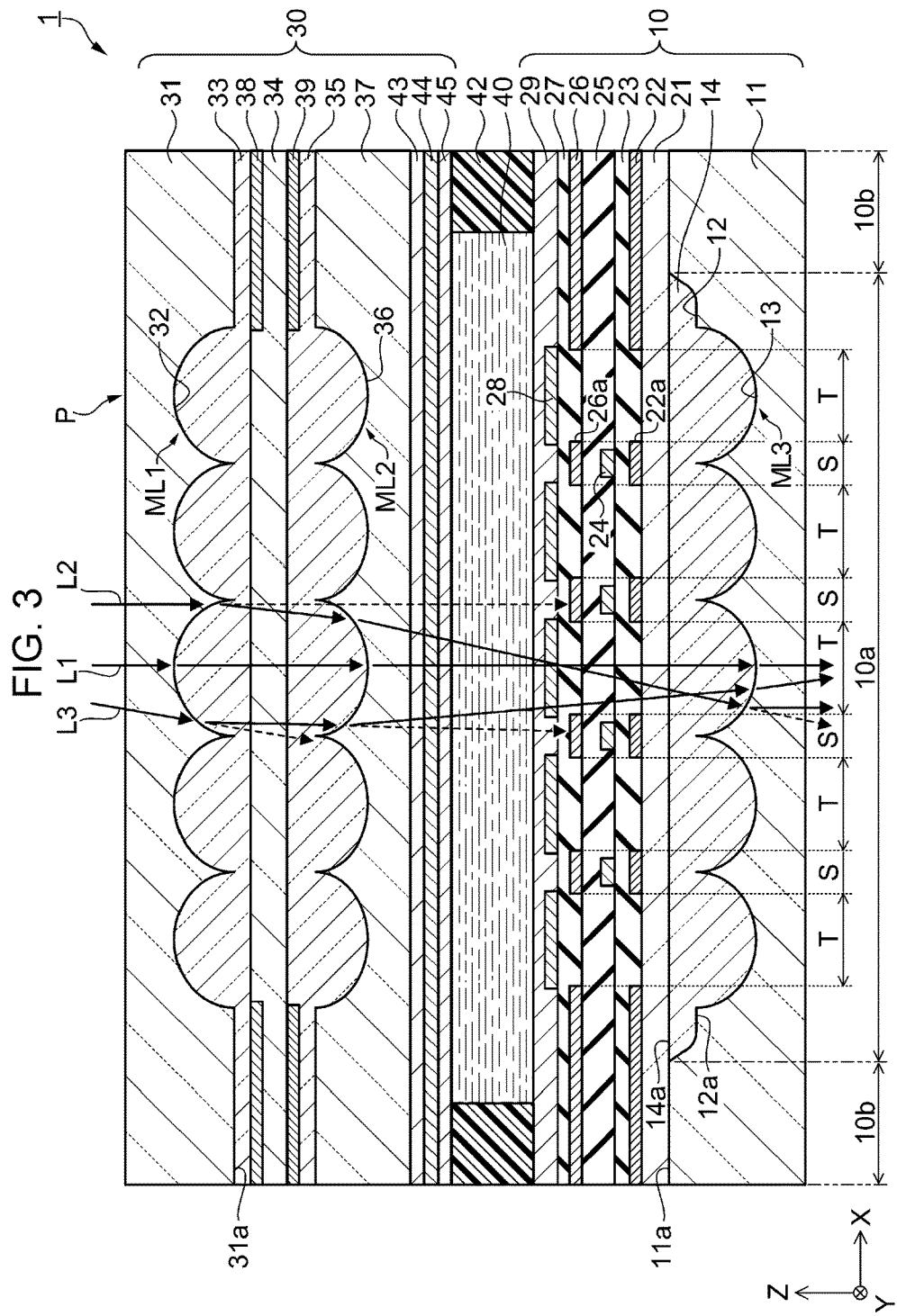
FIG. 3 is a schematic sectional view showing a configuration of the liquid crystal device according to the first embodiment.

First, the liquid crystal device as the electrooptical device according to the first embodiment will be described with reference to FIGS. 1 to 3. FIG. 1 is a schematic plan view showing a configuration of the liquid crystal device according to the first embodiment. FIG. 2 is an equivalent circuit diagram showing an electrical configuration of the liquid crystal device according to the first embodiment. FIG. 3 is a schematic sectional view showing a configuration of the liquid crystal device according to the first embodiment. Specifically, FIG. 3 is a schematic sectional view taken along line A-A' of FIG. 1.

As shown in FIG. 1 and FIG. 3, a liquid crystal device 1 according to the present embodiment includes an element substrate 10 as a second substrate, a counter substrate 30 as a first substrate which is disposed to face the element substrate 10, a sealing material 42, and a liquid crystal layer 40 as an electrooptical layer. As shown in FIG. 1, the size of the element substrate 10 is larger than that of the counter substrate 30, and both substrates are bonded to each other via the sealing material 42 which is disposed in a frame shape along the edge of the counter substrate 30.

The liquid crystal layer 40 is sealed in a space surrounded by the element substrate 10, the counter substrate 30, and the sealing material 42, and is configured with liquid crystals having positive or negative dielectric anisotropy. The sealing material 42 is, for example, formed of an adhesive such as a thermosetting or ultraviolet curable epoxy resin. A spacer (not shown) for holding a constant space between the element substrate 10 and the counter substrate 30 is added to the sealing material 42.

Light shielding layers 22 and 26 provided on the element substrate 10 and light shielding layers 38 and 39 provided on the counter substrate 30 are disposed on the inner side of the sealing material 42 disposed in a frame shape. The light shielding layers 22, 26, 38, and 39 have frame-shaped periphery portions and are, for example, formed of a metal or a metal oxide having light shielding properties. The inner side of the frame-shaped light shielding layers 22, 26, 38, and 39 is a display region E in which a plurality of pixels P are disposed. The pixel P has an approximately polygonal planar shape. The pixel P, for example, has an approximately rectangular shape and the pixels are arranged in a matrix shape.

The display region E is a region substantially contributing to the display in the liquid crystal device 1. The light shielding layers 22 and 26 provided on the element substrate 10 are, for example, provided in the display region E in a lattice shape so as to partition opening regions of the plurality of pixels P in a plan view. The liquid crystal device 1 may include a dummy region which is provided so as to surround the display region E and does not substantially contribute to the display.

A data line driving circuit 51 and a plurality of external connection terminals 54 are provided along a first side, on a side opposite to the display region E of the sealing material 42 formed along the first side of the element substrate 10. In addition, an inspection circuit 53 is provided on a side of the display region E of the sealing material 42 along a second side facing the first side. Further, scanning line driving circuits 52 are provided on the inner side of the sealing material 42 along other two sides which are orthogonal to the first and second sides and face each other.

A plurality of wirings 55 connecting the two scanning line driving circuits 52 to each other are provided on the display region E side of the sealing material 42 on the second side where the inspection circuit 53 is provided. Wirings connecting the data line driving circuit 51 and the scanning line driving circuits 52 are connected to the plurality of external connection terminals 54. Upper and lower electrical connection units 56 for realizing electric connection between the element substrate 10 and the counter substrate 30 are provided on the corners of the counter substrate 30. The disposition of the inspection circuit 53 are not limited thereto and may be provided at a position along the inner side of the sealing material 42 between the data line driving circuit 51 and the display region E.

In the following description, a direction along the first side on which the data line driving circuit 51 is provided is set as an X direction, and a direction along the other two sides which are orthogonal to the first side and face to each other is set as a Y direction. The X direction is a direction along line A-A' of FIG. 1. The light shielding layers 22 and 26 are provided in a lattice shape along the X direction and the Y direction. The opening regions of the pixels P are partitioned by the light shielding layers 22 and 26 in a lattice shape and arranged in a matrix shape along the X direction and the Y direction.

A direction which is orthogonal to the X direction and the Y direction and facing the front of FIG. 1 is set as a Z direction. In this specification, a view in a normal direction (Z direction) of the counter substrate 30 side surface of the liquid crystal device 1 is called a "plan view".

As shown in FIG. 2, in the display region E, scanning lines 2 and data lines 3 are formed to intersect with each other, and a pixel is provided according to the intersection of the scanning line 2 and the data line 3. A pixel electrode 28 and a TFT 24 as a switching element are provided in each of pixels P.

A source electrode (not shown) of the TFT 24 is electrically connected to the data line 3 extended from the data line driving circuit 51. Image signals (data signals) S1, S2, . . . , Sn are supplied to the data line 3 from the data line driving circuit 51 (see FIG. 1) in a line sequential manner. A gate electrode (not shown) of the TFT 24 is a part of the scanning line 2 extended from the scanning line driving circuit 52. Scanning signals G1, G2, . . . , Gm are supplied to the scanning line 2 from the scanning line driving circuit 52 in a line sequential manner. A drain electrode (not shown) of the TFT 24 is electrically connected to the pixel electrode 28.

By turning the state of the TFT 24 to an on state for a certain period of time, the image signals S1, S2, . . . , Sn are written in the pixel electrode 28 through the data line 3 at a predetermined timing. The image signals at a predetermined level written in the liquid crystal layer 40 through the pixel electrode 28 as described above are held at a liquid crystal capacitance formed between the liquid crystal layer and a common electrode 44 (see FIG. 3) provided on the counter substrate 30 for a certain period of time.

In order to prevent leakage of the held image signals S1, S2, . . . , Sn, a storage capacitance 5 is formed between a capacitance line 4 formed along the scanning line 2 and the pixel electrode 28 and is disposed in parallel to the liquid crystal capacitance. As described above, when a voltage signal is applied to the liquid crystals of each pixel P, an orientation state of the liquid crystals is changed in accordance with the applied voltage level. Therefore, light incident to the liquid crystal layer 40 (see FIG. 3) is modulated and gradation display may be performed.

Regarding the liquid crystals configuring the liquid crystal layer 40, the orientation and the order of molecular association in accordance with the applied voltage level, and thus, light is modulated and gradation display may be performed. For example, in a case of a normally white mode, transmittance with respect to incident light decreases in accordance with the applied voltage in a unit of each pixel P. In a normally black mode, transmittance with respect to incident light increases in accordance with the applied voltage in a unit of each pixel P, and light having contrast according to the image signal is entirely emitted from the liquid crystal device 1.

As shown in FIG. 3, the liquid crystal device 1 includes the element substrate 10, the counter substrate 30, the liquid crystal layer 40 sandwiched between the element substrate 10 and the counter substrate 30. In the liquid crystal device 1, light (L1, L2, and L3 indicated by arrows in FIG. 3) is incident from the counter substrate 30 side, transmitted through the liquid crystal layer 40, and emitted from the element substrate 10 side.

The counter substrate 30 includes a substrate 31 as a first base material, a lens layer 33 as a first lens layer, a light shielding layer 38, an intermediate layer 34, a light shielding layer 39, a lens layer 35 as a second lens layer, a light transmitting layer 37, a protective layer 43, a common electrode 44, and an orientation film 45. The lens layer 33 includes a microlens ML1 as the first microlens. The lens layer 35 includes a microlens ML2 as the second microlens. Therefore, the counter substrate 30 include two stages of the microlenses ML1 and ML2.

The substrate 31 is, for example, formed of an inorganic material having light transmittance such as glass or quartz. One surface of the substrate 31 on the side of the liquid crystal layer 40 is set as a surface 31a. The substrate 31 includes a plurality of recesses 32 formed on the surface 31a. Each recess 32 is provided for each pixel P. The sectional shape of the recess 32 is, for example, a curved surface such as a semicircle or a semiellipse. The recess 32 constitutes the lens surface of the microlens ML1.

The lens layer 33 is formed to be thicker than a depth of the recess 32 so as to fill the recess 32 and cover the surface 31a of the substrate 31. The lens layer 33 is formed of a material having light transmittance and having a refractive index different from that of the substrate 31. In the embodiment, the lens layer 33 is formed of an inorganic material having a refractive index greater than that of the substrate 31. The refractive index of the lens layer 33 is preferably 1.55 or more and 1.70 or less. As such an inorganic material, SiON is used, for example.

The microlens ML1 is configured by filling the recess 32 with the material forming the lens layer 33. That is, in the lens layer 33, the microlens ML1 is a projection portion which fills the recess 32 and protrudes toward the substrate 31 (light incident side). Each microlens ML1 is disposed for each pixel P. The surface of the lens layer 33 is a flat surface which is approximately parallel to the surface 31a of the substrate 31. Incident light that is incident on the microlens ML1 is concentrated toward the center (focal point of the curved surface) of the microlens ML1.

The light shielding layer 38 is provided on the lens layer 33. The light shielding layer 38 is provided so as to surround the surrounding of the display region E (see FIG. 1) where the microlens ML1 and the microlens ML2 are disposed. The light shielding layer 38 is, for example, formed of a metal or a metal oxide. The light shielding layer 38 may be provided in the display region E so as to be overlapped with the light shielding layer 22 and the light shielding layer 26 of the element substrate 10 in a plan view. In this case, the light shielding layer 38 may be formed in a lattice shape, an island shape, or a stripe shape, and is preferably disposed in a range narrower than that of the light shielding layer 22 and the light shielding layer 26 in a plan view.

The intermediate layer 34 is formed to cover the lens layer 33 and the light shielding layer 38. The intermediate layer 34 includes optical transparency and is formed of, for example, an inorganic material having substantially the same optical refractive index as the lens layer 35. As such an inorganic material, SiON is used, for example. The intermediate layer 34 includes a function of setting the distance from the microlens ML1 to the microlens ML2 to a desired value. The layer thickness of the intermediate layer 34 is suitably set based on optical conditions such as a focal length of the microlens ML1 according to a wavelength of light.

The light shielding layer 39 is provided on the intermediate layer 34 so as to be overlapped with the light shielding layer 38 in a plan view. The light shielding layer 39 is formed of the same material as the light shielding layer 38.

The lens layer 35 is formed on the intermediate layer 34 and the light shielding layer 39. The lens layer 35 is formed of, for example, the same material as the lens layer 33. Similarly to the refractive index of the lens layer 33, the refractive index of the lens layer 35 is preferably 1.55 or more and 1.70 or less. In addition, the refractive index of the lens layer 35 is preferably larger than the refractive index of the lens layer 33.

The lens layer 35 includes a plurality of projections 36 that protrude toward the liquid crystal layer 40 side (the side opposite to the microlens ML1). The projection 36 constitutes the lens surface of the microlens ML2. That is, the projection 36 of the lens layer 35 is the microlens ML2. Each projection 36 is provided for each pixel P and is disposed so as to be overlapped with each recess 32 in a plan view. Accordingly, the microlens ML2 is disposed so as to be overlapped with the microlens ML1 in a plan view. The sectional shape of the projection 36 is a curved surface such as a semicircle or a semiellipse.

The light transmitting layer 37 is formed so as to be thicker than the height of the projection 36 so as to fill the space between the projections 36 and the surrounding of the projection 36 so as to cover the lens layer 35. The light transmitting layer 37 is formed of an inorganic material having light transmittance and, for example, having a refractive index lower than that of the lens layer 35. As such an inorganic material, $SiO_2$ is used, for example. By covering the projection 36 with the light transmitting layer 37, the convex microlens ML2 protruding toward the liquid crystal layer 40 side is formed. Each microlens ML2 is disposed for each pixel P.

The light transmitting layer 37 has a function of flattening the unevenness of the surface of the lens layer 35 and setting the distance from the microlens ML2 to the light shielding layer 26 to a desired value. The layer thickness of the light transmitting layer 37 is suitably set based on optical conditions such as a focal length of the microlens ML2 according to a wavelength of light.

The protective layer 43 is provided so as to cover the light transmitting layer 37. The common electrode 44 is provided so as to cover the protective layer 43. The common electrode 44 is formed over the plurality of pixels P. The common electrode 44 is, for example, formed of a transparent conductive film such as indium tin oxide (ITO) or indium zinc oxide (IZO). The orientation film 45 is provided so as to cover the common electrode 44.

The element substrate 10 includes a substrate 11 as a second base material, a lens layer 14 as a third lens layer, a light transmitting layer 21, a light shielding layer 22, an insulating layer 23, the TFT 24, an insulating layer 25, light shielding layer 26, an insulating layer 27, a pixel electrode 28, and an orientation film 29. The lens layer 14 includes a microlens ML3 as a third microlens. That is, the element substrate 10 includes the microlens ML3. Therefore, the liquid crystal device 1 includes three stages of the microlenses ML1, ML2, and ML3.

The element substrate 10 includes a first region 10a and a second region 10b as an X-Y plane region thereof. The first region 10a is a region including the display region E (see FIG. 1) in which the pixel P is disposed. The second region 10b is a region outside the first region 10a.

The substrate 11 is, for example, formed of a material having light transmittance such as glass or quartz. One surface of the substrate 11 on the side of the liquid crystal layer 40 is set as a surface 11a. The substrate 11 includes the recess 12 as a first recess that is formed in the first region 10a on the surface 11a. At a bottom 12a of the recess 12, the recess 13 as a plurality of second recesses is provided. Each recess 13 is provided for each pixel P. The sectional shape of the recess 13 is, for example, a curved surface such as a semicircle or a semiellipse. The recess 13 constitutes the lens surface of the microlens ML3.

The lens layer 14 is formed so as to fill the recess 12 and the recess 13 in the first region 10a on the substrate 11. The lens layer 14 is formed of an inorganic having light transmittance and having a refractive index different from that of the substrate 11. In the embodiment, the refractive index of the lens layer 14 is larger than the refractive index of the substrate 11 and smaller than the refractive index of the lens layer 33 and the lens layer 35. The refractive index of the lens layer 14 is preferably 1.51 or more and 1.60 or less. As such an inorganic material, SiON is used, for example.

The microlens ML3 is configured by filling the recess 13 with the material forming the lens layer 14. That is, the microlens ML3 is a convex portion that fills the recess 13 in the lens layer 14 and protrudes toward the substrate 11 (the side from which light is emitted). Each microlens ML3 is disposed for each pixel P. The microlens ML3 is disposed so as to be overlapped with the microlens ML1 and the microlens ML2 in a plan view.

The surface 14a of the lens layer 14 constitutes a plane continuous with the surface 11a of the substrate 11 in the second region 10b. That is, the lens layer 14 is disposed in the first region 10a and is not disposed in the second region 10b. As described above, the configuration in which the lens layer 14 is disposed only in the first region 10a in the element substrate 10 is to suppress the generation of cracks and warpage of the lens layer 14 in the step of performing a heat treatment such as a semiconductor process for forming the TFT 24. This point will be explained in the method for manufacturing the electrooptical device described later.

The light transmitting layer 21 is formed so as to cover the surface 11a of the substrate 11 and the surface 14a of the lens layer 14. The light transmitting layer 21 includes light transmittance and is formed of, for example, an inorganic material such as $SiO_2$ having substantially the same optical refractive index as the substrate 11. The light transmitting layer 21 includes a function of protecting the lens layer 14 and setting the distance from the microlens ML2 to the microlens ML3 to a desired value. The layer thickness of the light transmitting layer 21 is suitably set based on optical conditions such as a focal length of the microlens ML2 according to a wavelength of light.

The light shielding layer 22 is provided on the light transmitting layer 21. The light shielding layer 22 is formed in a lattice shape so as to be overlapped on the light shielding layer 26 which is the upper layer in a plan view. The light shielding layer 22 and the light shielding layer 26 are, for example, formed of a metal or a metal compound. The light shielding layer 22 and the light shielding layer 26 are disposed so as to interpose the TFT 24 in a thickness direction (Z direction) of the element substrate 10. The light shielding layer 22 is overlapped with at least a channel region of the TFT 24 in a plan view.

Since the incidence of light from the substrate 11 side to the TFT 24 is suppressed by the light shielding layer 22 and the light incident on the TFT 24 from the liquid crystal layer 40 side is suppressed by the light shielding layer 26, it is possible to suppress an increase in light leakage current and malfunction due to the light in the TFT 24. A light shielding portion S is configured with the light shielding layer 22 and the light shielding layer 26. A region (inside of an opening 22a) surrounded by the light shielding layer 22 and a region (inside of an opening 26a) surrounded by the light shielding layer 26 are overlapped with each other in a plan view and become openings T of the region of the pixel P through which light is transmitted.

The insulating layer 23 is provided so as to cover the light transmitting layer 21 and the light shielding layer 22. The insulating layer 23 is, for example, formed of an inorganic material such as $SiO_2$.

The TFT 24 is provided on the insulating layer 23 and is disposed in a region overlapped with the light shielding layer 22 and the light shielding layer 26 in a plan view. The TFT 24 is a switching element driving the pixel electrode 28. The TFT 24 is configured with a semiconductor layer, a gate electrode, a source electrode, and a drain electrode (not shown). In the semiconductor layer, a source region, a channel region, and a drain region are formed. A lightly doped drain (LDD) region may be formed on an interface between the channel region and the source region or between the channel region and the drain region.

The gate electrode is formed in a region overlapped with the channel region of the semiconductor layer in a plan view in the element substrate 10 through a part of the insulating layer 25 (gate insulating film). Although not shown, the gate electrode is electrically connected to the scanning line disposed on a lower layer side through a contact hole and controls the on/off state of the TFT 24 by applying scanning signals.

The insulating layer 25 is provided so as to cover the insulating layer 23 and the TFT 24. The insulating layer 25 is, for example, formed of an inorganic material such as $SiO_2$. The insulating layer 25 includes a gate insulating film which insulates the semiconductor layer and the gate electrode of TFT 24 from each other. Unevenness of the surface generated due to the TFT 24 is alleviated by the insulating layer 25. The light shielding layer 26 is provided on the insulating layer 25. The insulating layer 27 formed of an inorganic material is provided so as to cover the insulating layer 25 and the light shielding layer 26.

The pixel electrode 28 is provided for each pixel P on the insulating layer 27. The pixel electrode 28 is disposed in a region overlapped with the opening 22a of the light shielding layer 22 and the opening 26a of the light shielding layer 26 in a plan view. The pixel electrode 28 is, for example, formed of a transparent conductive film such as indium tin oxide (ITO) or indium zinc oxide (IZO). The orientation film 29 is provided so as to cover the pixel electrode 28. The liquid crystal layer 40 is sealed between the orientation film 29 on the element substrate 10 side and the orientation film 45 on the counter substrate 30 side.

Although not shown, in the region overlapped with the light shielding layer 22 and the light shielding layer 26 in a plan view, electrodes, wirings, and relay electrodes for supply an electric signal to the TFT 24 or capacitance electrodes constituting the storage capacitance 5 (see FIG. 2) are provided. The light shielding layer 22 or the light shielding layer 26 may have a configuration of including such electrodes, wirings, relay electrodes, and capacitance electrodes.

In the liquid crystal device 1 according to the embodiment, the light emitted from a source or the like is incident from the counter substrate 30 (substrate 31) side having the microlens ML1 and ML2 and is emitted from the element substrate 10 (substrate 11) side having the microlense ML3. In a case where the liquid crystal device 1 is used as the liquid crystal light bulb of a projector, the light incident on the liquid crystal device 1 has more parallel light along the normal direction of the surface of the counter substrate 30 (substrate 31).

Hereinafter, the normal direction of the surface of the counter substrate 30 (substrate 31) is simply referred to as a "normal direction". The "normal direction" is a direction along the Z direction of FIG. 3 and is approximately the same direction as the normal direction of the element substrate 10 (substrate 11).

Among the light beams incident on the liquid crystal device 1, the light L1 incident on the center of the microlens ML1 in the first stage along the normal direction travels straight and strikes the center of the microlens ML2 in the second stage, travels straight ahead, and is transmitted through the liquid crystal layer 40. Then, the light L1 is transmitted through an opening T of the pixel P, is incident on the center of the microlens ML3 of the third stage, travels straight, and is emitted from the element substrate 10 side.

In a case where light L2 incident near the end portion of the microlens ML1 along the normal direction travels straight, the light L2 may be shielded by the light shielding layer 26 as shown with a broken line, but the light L2 is refracted to the center side of the microlens ML1 and incident to the microlens ML2 due to the refractive power of the microlens ML1 (difference in the refractive index between the substrate 31 and the lens layer 33). Then, the light L2 incident on the microlens ML2 is further refracted to the center side of the microlens ML2 by the refractive power (difference in the refractive index between the lens layer 35 and the light transmitting layer 37) of the microlens ML2, travels obliquely with respect to the normal direction, and is transmitted through the opening T.

In a case where the light L2 refracted by the microlens ML2 and incident on the microlens ML3 obliquely to the normal direction travels straight forward as it is, the light L2 travels outward with respect to the center of the microlens ML 3 as shown by the broken line and becomes light spreading outward from the region of the pixel P. However, due to the refractive power of the microlens ML3 (difference in the refractive index between the substrate 11 and the lens layer 14), the light L2 incident on the microlens ML3 is bent back to the center side of the microlens ML3 and the side of the element substrate 10.

Some light incident on the liquid crystal device 1 is incident obliquely with respect to the normal direction, such as the light L3. In a case where the light L3 incident obliquely with respect to the normal direction of the microlens ML1 and toward the outside with respect to the center of the microlens ML1 travels straight forward as it is, the light L3 is directed toward the adjacent pixel P as indicated by the broken line, but is refracted to the center side of the microlens ML1 by the refractive power of the microlens ML1 and is incident on the microlens ML2.

In a case where the light L3 incident on the microlens ML2 travels straight forward as it is, the light L3 is shielded by the light shielding layer 26 as indicated by the broken line, but is refracted to the center side of the microlens ML 2 by the refractive power of the microlens ML2, transmitted through the opening T, is incident on the microlens ML3, and emitted from the element substrate 10 side.

Thus, in the liquid crystal device 1, the light L2 and L3 which is shield by the light shielding layer 26 in a case of traveling straight forward as it is may be transmitted through the opening T by concentrating the light L2 and L3 in the two stages of the microlenses ML1 and ML2. Then, by bending the light L3 traveling to the outside of the region of the pixel P in a case of traveling straight forward as it is inward by the microlens ML3, the spread of light emitted from the element substrate 10 side may be suppressed.

In addition, in the embodiment, it is desirable to increase the light incident on the microlens ML2 by concentrating by the microlens ML1, further concentrate the light by the microlens ML2, and transmitting through the opening T. When the refractive index of the microlens ML1 is too large, light is concentrated in the center of the microlens ML2 by the microlens ML1, and the brightness in the region of the pixel P becomes nonuniform. Therefore, the refractive index of the microlens ML1 (lens layer 33) is preferably smaller than the refractive index of the microlens ML2 (lens layer 35).

On the other hand, the microlens ML3 has a role of bending back the light which is concentrated by the microlens ML2 and transmitted through the opening T and travels to the outside of the region of the pixel P. However, when the bending angle of light by the microlens ML3 is too large, the oblique light may increase rather. Therefore, the refractive index of the microlens ML3 (lens layer 14) is preferably smaller than the refractive indices of the microlens ML1 (lens layer 33) and the microlens ML2 (lens layer 35).

Among the light beams incident on the liquid crystal device 1, light which is shielded by the light shielding portion S (the light shielding layer 26) and transmitted through the opening T is unused light. Also, when the spread of light emitted from the liquid crystal device 1 is large, the amount of light with which a region other than the effective projection region of the projection lens of the projector is irradiated increases, which causes a reduction in light utilization efficiency and contrast in the projector. According to the configuration of the liquid crystal device 1, since light incident from the counter substrate 30 side is concentrated in the opening T by the microlens ML1 and ML2, the light shielding portion S may increase the amount of light transmitted without being shielded. Since the microlens ML3 suppresses the spread of light and emits light from the element substrate 10 side, it is possible to improve the light utilization efficiency and the contrast in the projector.

Configuration of Third Microlens

Figure 4:
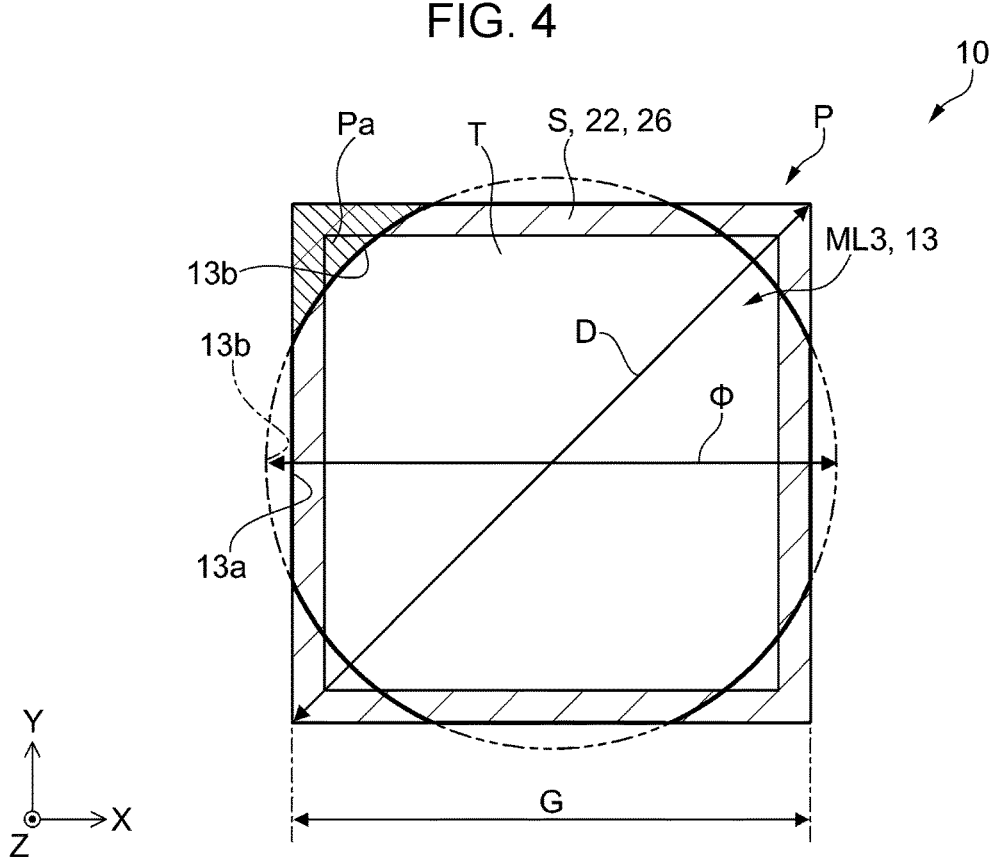
FIG. 4 is a schematic plan view of a third microlens according to the first embodiment.
Figure 5:
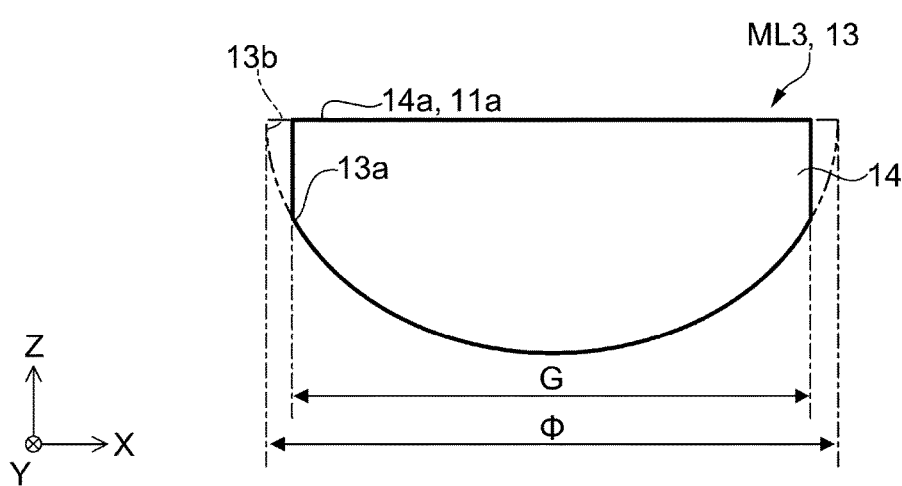
FIG. 5 is a schematic sectional view of the third microlens shown in FIG. 4.
Figure 6:
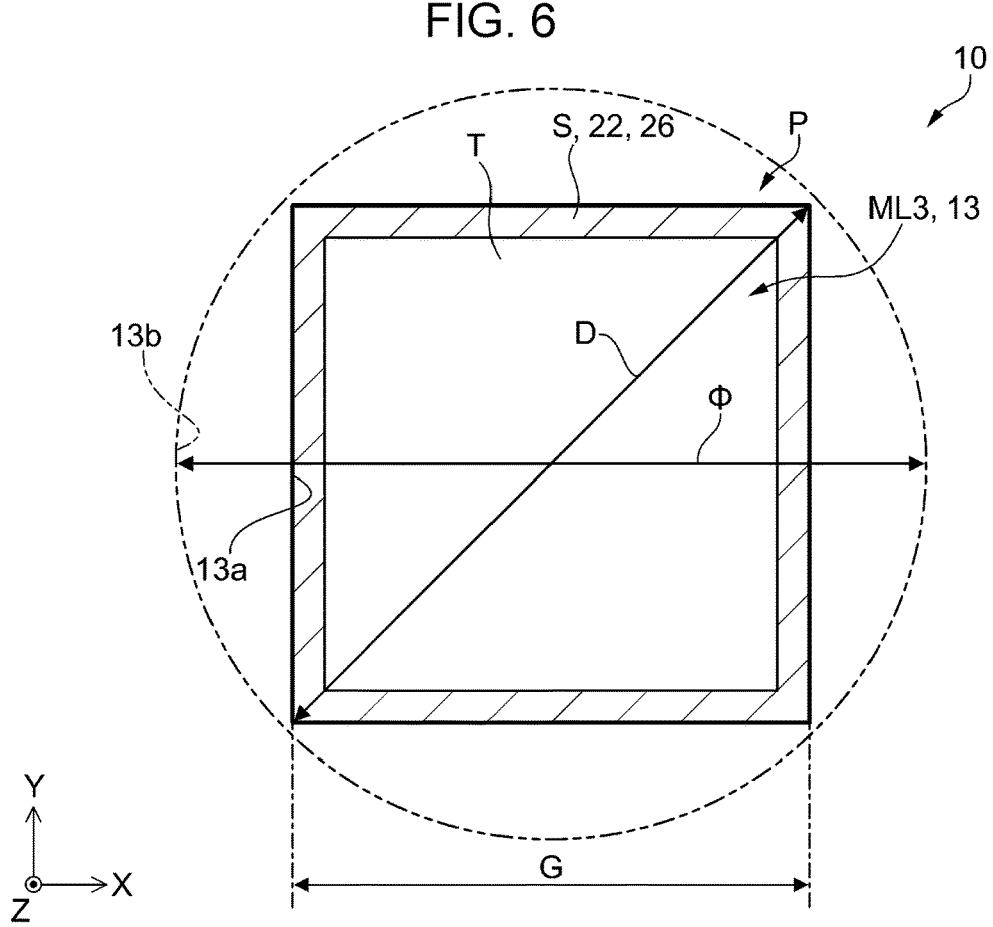
FIG. 6 is a schematic plan view of the third microlens according to the first embodiment.
Figure 7:
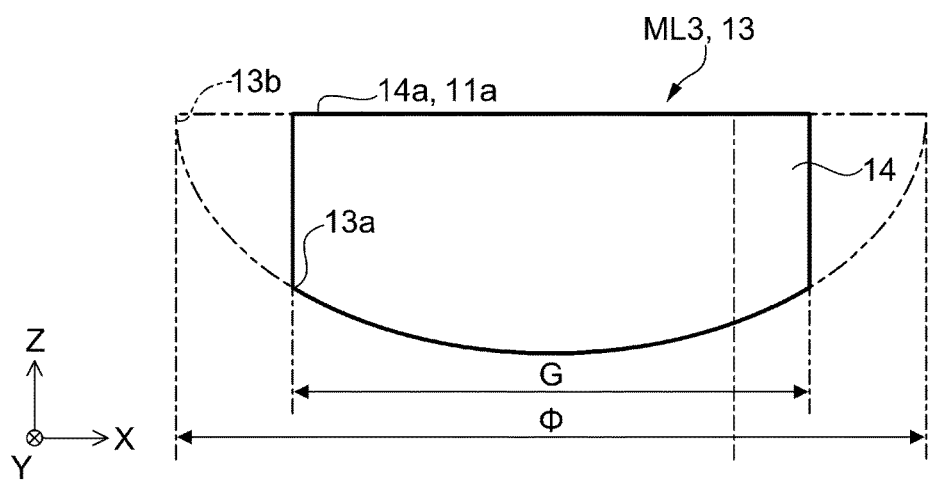
FIG. 7 is a schematic sectional view of the third microlens shown in FIG. 6.

Next, the configuration of the microlens ML3 as the third microlens will be described with reference to FIGS. 4, 5, 6, and 7. FIGS. 4 and 6 are schematic plan views of the third microlens according to the first embodiment. FIG. 5 is a schematic sectional view of the third microlens shown in FIG. 4. FIG. 7 is a schematic sectional view of the third microlens shown in FIG. 6. FIGS. 5 and 7 show an X-Z cross section of the microlens ML3, but a Y-Z cross section of the microlens ML3 has the same cross section.

FIG. 4 shows one pixel P in the element substrate 10. As shown in FIG. 4, the pixel P includes a substantially rectangular planar shape. The plurality of pixels P having such a shape are arranged such that adjacent pixels P in the X direction and the Y direction are in contact with each other. At the periphery portion of the pixel P, the light shielding portion S (the light shielding layers 22 and 26) is arranged along the outer periphery of the pixel P. The light shielding portion S is arranged along the boundary between adjacent pixels P in the X direction and the Y direction. In the pixel P, the inside of the light shielding portion S is the opening T through which light is transmitted.

It is assumed that the length of the diagonal line of the pixel P is D and the length of one side of the pixel P in the X direction is G. The arrangement pitch of the pixel P in the X direction is G. When it is assumed that the planar shape of the pixel P is a square, the arrangement pitch of the pixel P in the Y direction is also G, and the length D of the diagonal line of the pixel P is $\sqrt{2}$ times the arrangement pitch G. For example, if the arrangement pitch G of the pixel P is 10 μm, the length D of the diagonal line of the pixel P is about 14 μm.

The recess 13 constituting the lens shape of the microlens ML3 of the element substrate 10 has a substantially circular planar shape shown virtually as a two-dot chain line. The virtual outer shape of this microlens ML3 (the recess 13) is larger than the inscribed circle of the pixel P. That is, a lens diameter (the diameter of the recess 13) Φ of the microlens ML3 is larger than the arrangement pitch G of the pixel P. In other words, the lens diameter Φ of the microlens ML3 is larger than 71% ($1/\sqrt{2}$) of the length D of the diagonal line of the pixel P.

FIG. 4 shows an example in which the lens diameter Φ of the microlens ML3 is larger than the arrangement pitch G of the pixel P and smaller than the length D of the diagonal line. In the example shown in FIG. 4, an outer peripheral end portion 13b of the microlens ML3 (the recess 13) is disposed in the pixel P in the diagonal direction of the pixel P, but not disposed in the pixel P in the X direction and the Y direction. That is, the adjacent microlenses ML3 (the recess 13) in the diagonal direction of the pixel P are separated from each other, but the adjacent microlenses ML3 (the recess 13) in the X direction and the Y direction are connected to each other. In other words, at least a part of the microlens ML3 is in contact with the adjacent microlenses ML3.

Since the adjacent microlenses ML3 in the diagonal direction of the pixel P are separated from each other, the region Pa not overlapping with the microlenses ML3 in a plan view exists at the four corners of the pixel P. In this region Pa, the lens layer 14 is disposed, but the recess 13 serving as the lens surface is not disposed. Therefore, light incident on the opening T in the region Pa is not incident on the microlens ML3 but is emitted from the element substrate 10 as it is.

Here, although not shown, in a case where the outer shape of the microlens ML3 is smaller than the inscribed circle of the pixel P, that is, a case where the lens diameter Φ of the microlens ML3 is smaller than the arrangement pitch G of the pixel P (the lens diameter Φ is smaller than 71% of the length D of the diagonal line of the pixel P) is considered. In such a case, since the adjacent microlenses ML3 are also separated from each other also in the X direction and the Y direction, the region Pa not overlapping with the microlenses ML3 in a plan view exists not only at the four corners of the pixel P but also around the entire circumference.

As a result, among the oblique light beams concentrated by the microlenses ML1 and ML2, since light that is not incident on the microlens ML3 and is not concentrated (that is not bent back) increases, the spread of the light emitted from the liquid crystal device 1 becomes large, which causes a decrease in light utilization efficiency and contrast in the projector. Therefore, it is desirable that the region Pa in the region of the pixel P is as small as possible.

FIG. 5 shows an XZ cross section of the microlens ML3 shown in FIG. 4. As shown in FIG. 5, the cross section shape of the microlens ML3 is a curved surface such as a semicircle or a semiellipse. Therefore, the angle formed by the lens surface (the recess 13) of the microlens ML3 and the surface 14a of the lens layer 14, which is a plane continuous with the surface 11a of the substrate 11 (see FIG. 3) increases from the center of the microlens ML3 toward the virtual outer peripheral end portion 13b.

Therefore, among the light beams incident on the microlens ML3 along the normal direction, the light incident on the outer peripheral end portion 13b side of the microlens ML3 has a larger refraction angle (bending angle of light) because the incident angle to the lens surface becomes larger. That is, the portion of the microlens ML3 closer to the outer peripheral end portion 13b is an effective portion for bending incident light toward the center of the microlens ML3 and concentrating the light.

However, in the outer peripheral end portion 13b, since the angle formed by the lens surface and the surface 14a is close to a right angle, the bending angle of the incident light becomes large, oblique light is likely generated, and reflected light is also likely generated. Reflected light reflected from the lens surface causes stray light. Therefore, in a case where the lens diameter Φ of the microlens ML3 is smaller than the arrangement pitch G of the pixel P, since the outer peripheral end portion 13b of the microlens ML3 is disposed in the region of the pixel P over the entire circumference, reflected light which causes oblique light and stray light is likely generated.

In the embodiment, by making the outer shape of the microlens ML3 larger than the inscribed circle of the pixel P, that is, making the lens diameter Φ of microlens ML3 larger than 71% of the length D of the diagonal line of the pixel P, the area of the region Pa in which the microlens ML3 is not disposed in each pixel P may be reduced. In this way, it is possible to increase the amount of light which is incident on the microlens ML3 and concentrated (bent back), so that the light utilization efficiency and contrast may be improved. Since this means that the light-gathering power of the microlens ML3 is increased, it is possible to reduce the refractive index of the lens layer 14.

In addition, by making the lens diameter Φ of the microlens ML3 larger than 71% of the length D of the diagonal line of the pixel P, the outer peripheral end portion 13b is disposed at the four corners of the pixel P (see FIG. 4), which is likely to cause oblique light and easily causes reflected light, but not arranged in the X direction and the Y direction. In this way, it is possible to reduce oblique light and reflected light that causes stray light.

In the embodiment, the diameter φ (the diameter of the recess 13) of the microlens ML3 is preferably 85% or more and 110% or less of the length D of the diagonal line of the pixel P, and 90% or more and 100% or less of the length D of the diagonal line of the pixel P.

By setting the lens diameter Φ of the microlens ML3 to 85% or more of the length D of the diagonal line of the pixel P, the region Pa in the region of the pixel P may be reduced to increase the light incident on the microlens ML3. In addition, by setting the lens diameter Φ of the microlens ML3 to 90% or more of the length D of the diagonal line of the pixel P, the region Pa may be further reduced to increase the light incident on the microlens ML3.

FIG. 6 shows an example in which the lens diameter Φ of the microlens ML3 is larger than the length D of the diagonal line of the pixel P. As shown in FIG. 6, when the lens diameter Φ of the microlens ML3 exceeds 100% of the length D of the diagonal line of the pixel P, the adjacent microlenses ML3 are separated from each other not only in the X direction and the Y direction but also in the diagonal direction. Therefore, since the region Pa which does not overlap with the microlens ML3 in a plan view disappears, the light transmitted through the opening T is incident on the microlens ML3. In addition, since the outer peripheral end portion 13b of the microlens ML3 is not disposed within the region of the pixel P, oblique light and reflected light are reduced.

However, when the lens diameter Φ of the microlens ML3 is too large with respect to the pixel P, the light-gathering power of the microlens ML3 decreases. The reason for this will be explained below.

As described above, among the light beams incident on the microlens ML3 along the normal direction, the refraction angle (the bending angle of light) increases as the light is incident on the outer peripheral end portion 13b side of the microlens ML3. As shown in FIG. 7, when the lens diameter Φ of the microlens ML 3 further increases, compared with the case shown in FIG. 5, the virtual outer peripheral end portion 13b of the microlens ML3 in the X direction is located further outside the pixel P. Therefore, as compared with the case shown in FIG. 5, the angle formed by the lens surface and the surface 14a becomes smaller at an actual outer peripheral end portion 13a of the microlens ML3 in the X direction, thus the refraction angle of light incident near the outer peripheral end portion 13a becomes smaller.

The fact that the angle of refraction of light incident near the outer peripheral end portion 13a of the microlens ML3 decreases means that the force for bending back the light obliquely incident on the microlens ML3 toward the center side like the light L2 shown in FIG. 3 is weakened. That is, when the lens diameter Φ of the microlens ML3 becomes too large with respect to the pixel P, the portion of the microlens ML3 closer to the outer peripheral end portion 13b, which is effective for bending incident light to the center side of the microlens ML3 and concentrating the light, becomes smaller, thus the effect of suppressing spread of the light emitted from the liquid crystal device 1 is reduced.

Therefore, in order to reduce the region Pa in the pixel P and increase the light incident on the microlens ML3 while maintaining the force for suppressing the spread of the emitted light, it is preferable to set the lens diameter Φ of the microlens ML3 to 85% or more and 110% or less of the length D of the diagonal line of the pixel P, and more preferably 90% or more and 100% or less of the length D of the diagonal line of the pixel P.

Figure 8:
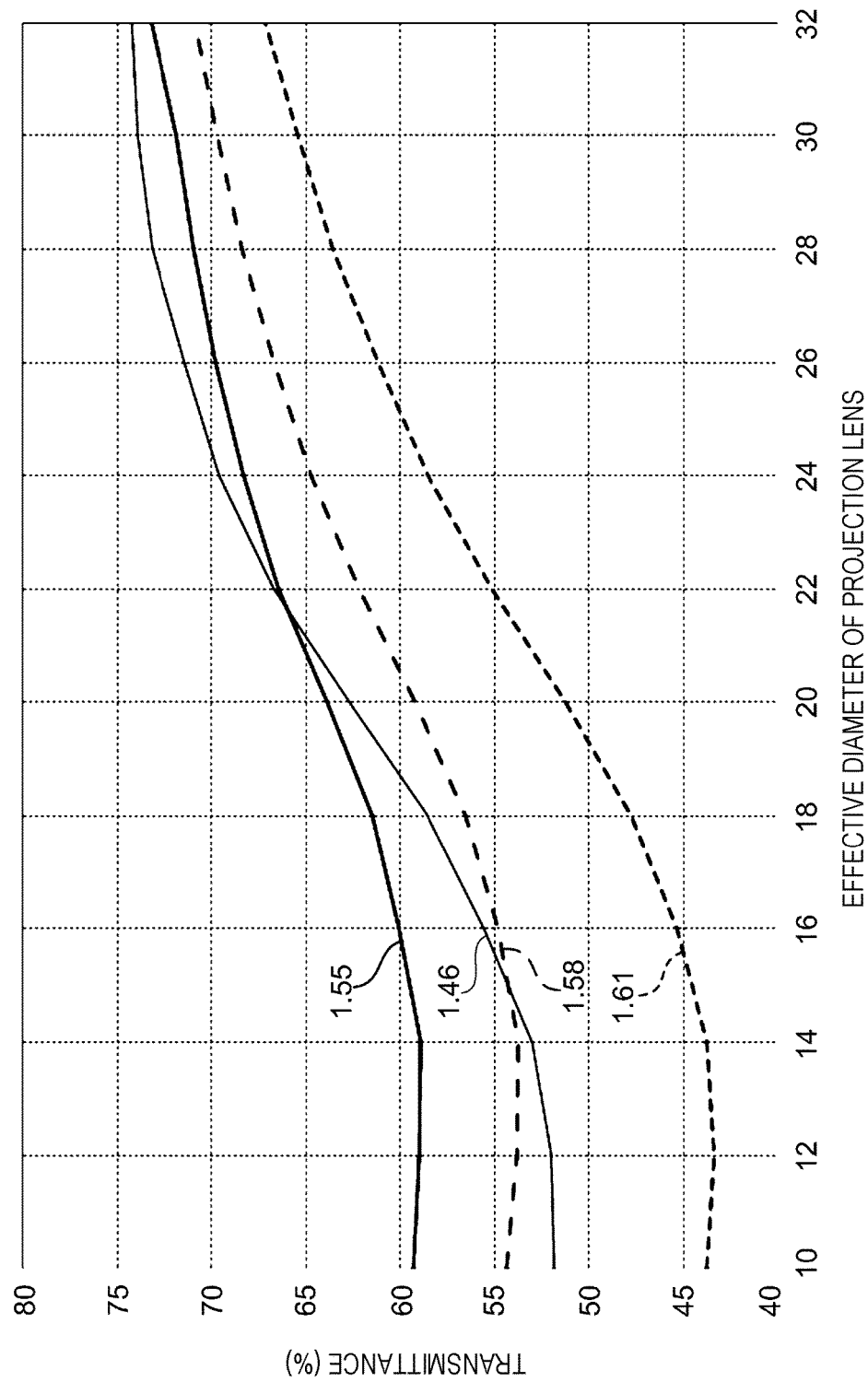
FIG. 8 is a graph showing a relationship between a refractive index of a third lens layer and light transmittance.
Figure 9:
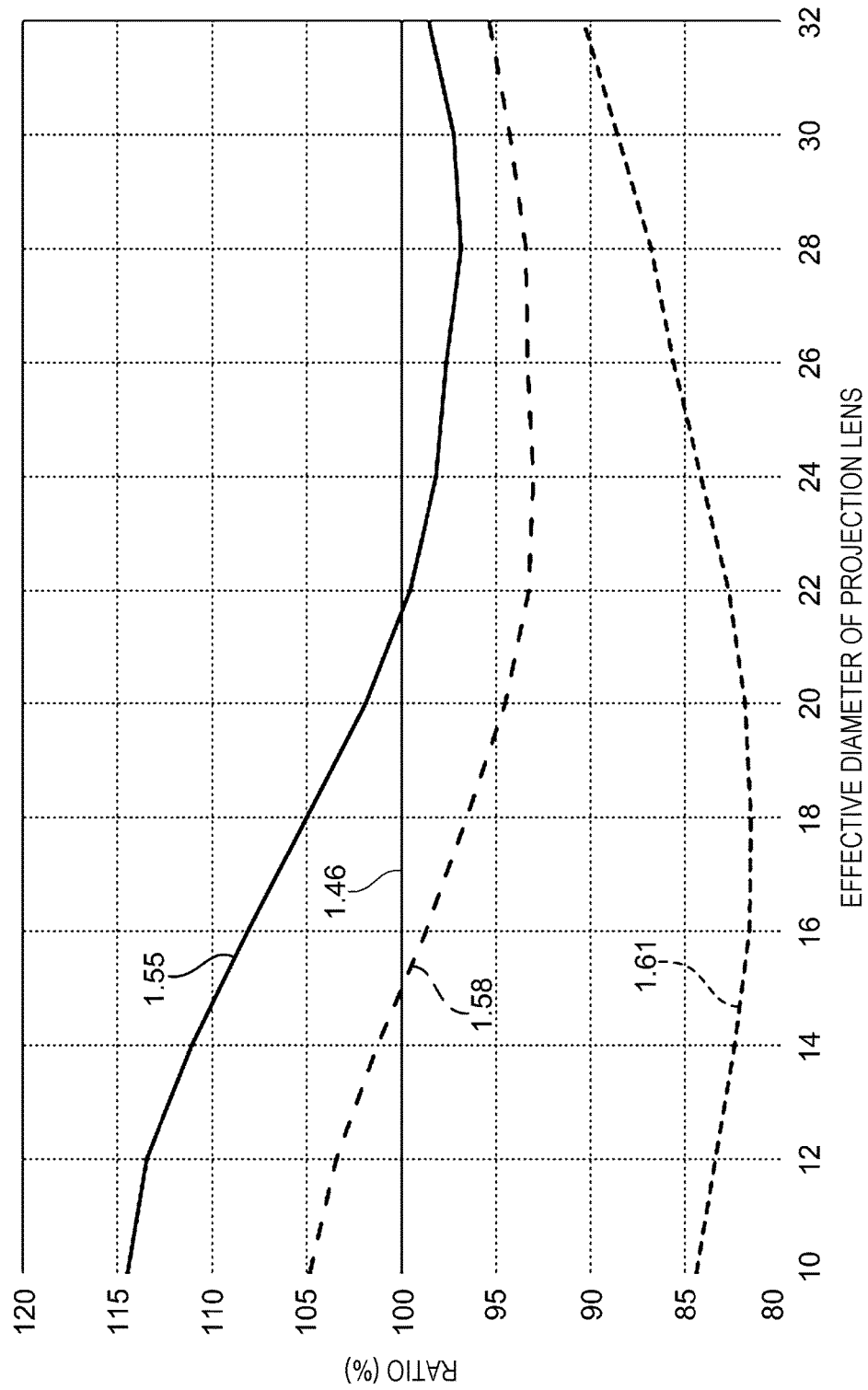
FIG. 9 is a graph showing a relationship between a refractive index and a transmittance ratio of the third lens layer.

Next, the refractive index of the lens layer 14 constituting the microlens ML 3 will be described with reference to FIGS. 8 and 9. FIG. 8 is a graph showing a relationship between the refractive index and the light transmittance of the third lens layer. FIG. 9 is a graph showing a relationship between the refractive index and the transmittance ratio of the third lens layer.

FIG. 8 shows the difference in transmittance of light transmitted through the projection lens in a case where the refractive index of the lens layer 33 constituting the microlens M 1 and the refractive index of the lens layer 35 constituting the microlens ML2 are fixed and the refractive index of the lens layer 14 is made different in the projector to which the liquid crystal device 1 is applied.

In FIG. 8, the horizontal axis is an effective diameter (mm) of the projection lens. The vertical axis is transmittance (%) of the light transmitted through the projection lens. The effective diameter of an incident lens is 18 mm. In FIG. 8, the refractive index of the lens layer 14 constituting the microlens ML3 is made different in four stages of 1.46, 1.55, 1.58, and 1.61. The refractive index 1.46 is the same as the refractive index of the substrate 11 when the material is quartz. Therefore, in a case where the refractive index of the lens layer 14 is 1.46, it is agreed that the element substrate 10 does not include microlens ML3.

If the focal length is the same, as the effective diameter of the projection lens increases, the amount of incident light increases, thus the light transmittance increases and the image to be projected becomes brighter. However, in a case where the effective diameter of the projection lens increases, contrast decreases more easily as the incident oblique light increases. Also, the larger the effective diameter of the projection lens, the smaller the F value of the projection lens, and the higher the cost of the projection lens. In the embodiment, in a range where the effective diameter of the projection lens is small (for example, 18 mm or less), it is desirable to set the refractive index of the lens layer 14 so that the light transmittance increases (the image becomes brighter).

As shown in FIG. 8, in a case where the refractive index of the lens layer 14 is 1.55, the transmittance in a range where the effective diameter of the projection lens is smaller than 22 mm is higher than the transmittance in a case where the refractive index is 1.46. In a case where the refractive index of the lens layer 14 is 1.58, the transmittance in a range where the effective diameter of the projection lens is smaller than 16 mm is higher than the transmittance in a case where the refractive index is 1.46. On the other hand, the transmittance in a case where the refractive index of the lens layer 14 is 1.61 is lower than the transmittance in a case where the refractive index is 1.46 regardless of the range of the effective diameter of the projection lens.

FIG. 9 is a graph showing the result of FIG. 8 as a relative ratio to the transmittance in a case where the refractive index of the lens layer 14 is 1.46. As shown in FIG. 9, when the refractive index of the lens layer 14 is made larger than 1.46 to be 1.55, the light transmittance is improved by about 15% as compared with the case where the refractive index is 1.46. When the refractive index of the lens layer 14 is set to be 1.55 or more and 1.58, the light transmittance is improved by about 5% compared with the case where the refractive index is 1.46, but is lower than in the case where the refractive index is 1.55. When the refractive index increases to 1.61, the light transmittance is lower than the case where the refractive index is 1.46. From the above results, it is preferable to set the refractive index of the lens layer 14 constituting the microlens ML3 within a range of 1.51 or more and 1.60 or less.

Method for Manufacturing Electrooptical Device

Figure 10:
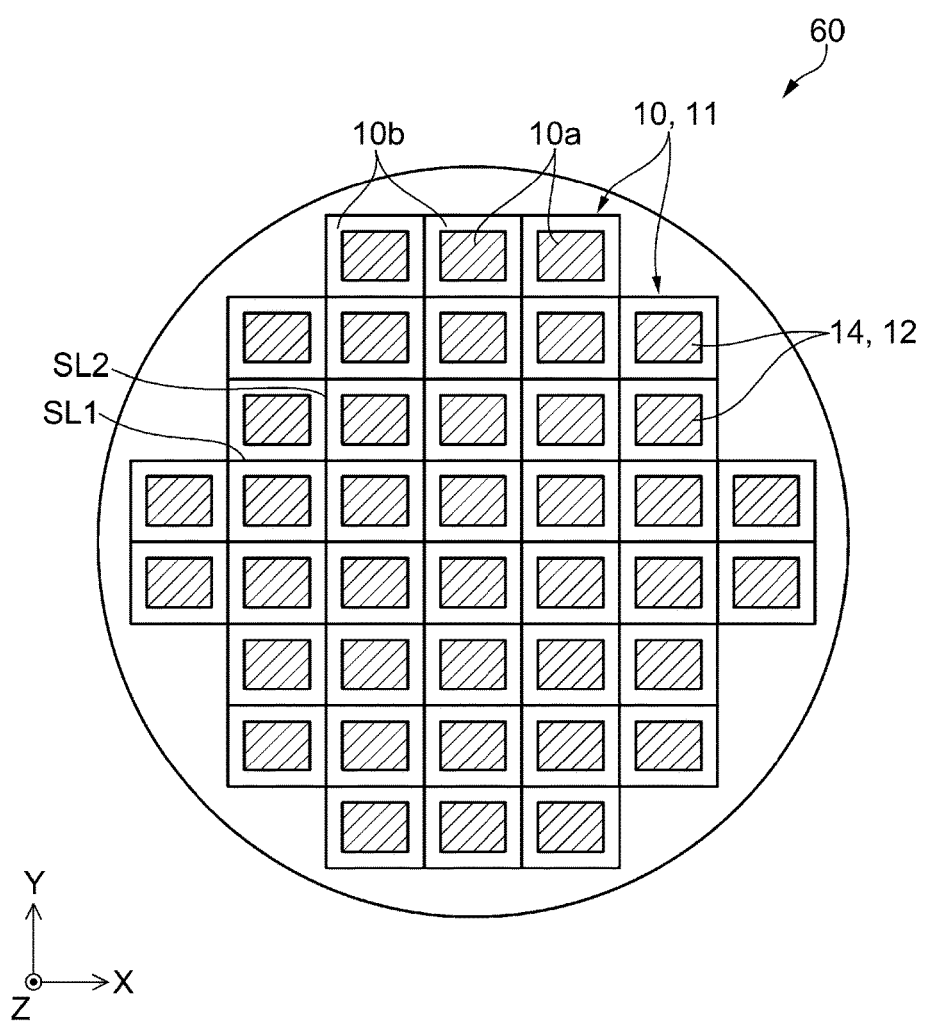
FIG. 10 is a schematic plan view of a mother substrate.

Next, a method for manufacturing the liquid crystal device 1 as the electrooptical device according to the first embodiment will be described. First, a manufacturing method of the element substrate 10 will be described with reference to FIGS. 10 to 20. FIG. 10 is a schematic plan view of a mother substrate. FIGS. 11 to 20 are schematic cross section views showing a method for manufacturing the element substrate. FIGS. 11 to 20 correspond to a schematic cross section along the line A-A' of FIG. 1.

As shown in FIG. 10, in the manufacturing step of the element substrate 10, processing is performed in a state of a large mother substrate 60 capable of taking a plurality of the element substrates 10. Then, finally by cutting along a scribe line SL1 along the X direction and along a scribe line SL2 along the Y direction from the mother substrate 60 to form individual pieces, thereby obtaining a plurality of the element substrates 10. Therefore, in each step described below, processing is performed in the state of the mother substrate 60 before forming individual pieces, but here, processing contents for each element substrate 10 will be explained.

Figure 11:
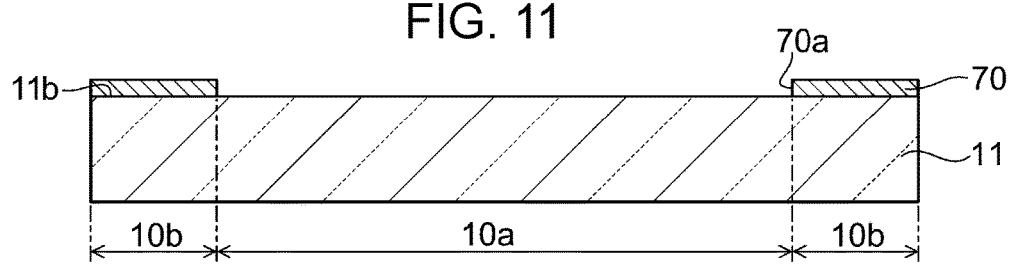
FIG. 11 is a schematic sectional view showing a method for manufacturing an element substrate.

First, as shown in FIG. 11, a mask layer 70 is formed over the first region 10a and the second region 10b on a surface 11b of the light-transmitting substrate 11 (mother substrate 60) made of quartz or the like. The mask layer 70 is not particularly limited, but for example, a hard mask made of a metal material such as W (tungsten) or WSi (tungsten silicide) may be used. Then, the mask layer 70 is patterned to form the opening 70a in the first region 10a of the mask layer 70. As a result, the surface 11b of the substrate 11 is exposed in the opening 70a (the first region 10a). FIG. 11 shows a state in which the opening 70a is formed.

Figure 12:
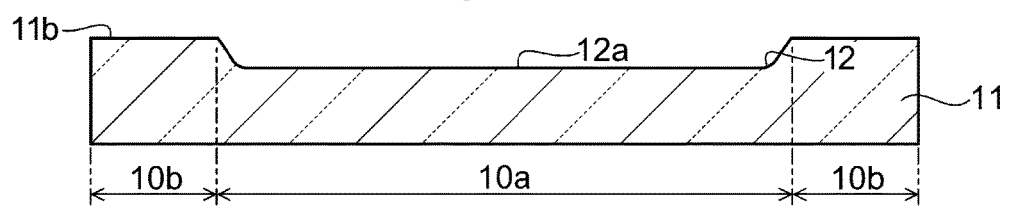
FIG. 12 is a schematic sectional view showing a method for manufacturing the element substrate.

Subsequently, isotropic etching such as wet etching is applied to the substrate 11 via the opening 70a of the mask layer 70. As a result, as shown in FIG. 12, the substrate 11 is etched through the opening 70a, and the recess 12 having the bottom 12a is formed in the first region 10a. After completion of etching, the mask layer 70 is removed. FIG. 12 shows a state in which the mask layer 70 is removed. At this time, in the state of the mother substrate 60 shown in FIG. 10, the recess 12 is independently formed in the first region 10a of each unit of the element substrate 10.

Figure 13:
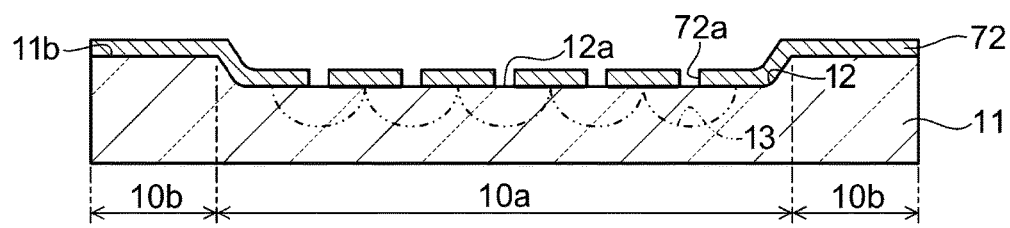
FIG. 13 is a schematic sectional view showing a method for manufacturing the element substrate.

Subsequently, as shown in FIG. 13, a mask layer 72 is formed over the first region 10a and the second region 10b of the substrate 11. The mask layer 72 is formed so as to cover the surface 11b of the substrate 11 and the entire recess 12. Then, the mask layer 72 is patterned to form a plurality of openings 72a in a region covering the bottom 12a of the recess 12 in the mask layer 72. The planar center position of each opening 72a is the center in the formed recess 13.

Figure 14:
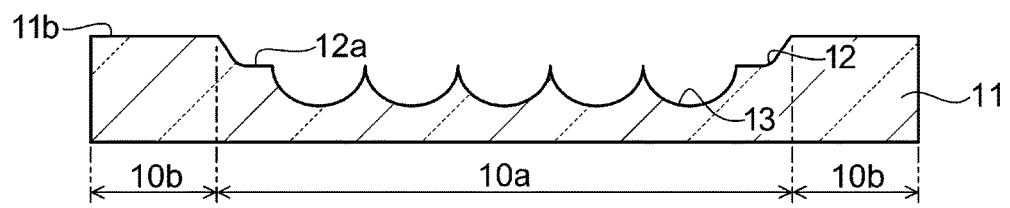
FIG. 14 is a schematic sectional view showing a method for manufacturing the element substrate.

Subsequently, the substrate 11 is isotropically etched through the opening 72a of the mask layer 72. As a result, as shown in FIG. 14, the substrate 11 is etched through the opening 72a, and a plurality of the recess 13 is formed in the bottom 12a of the recess 12. After completion of etching, the mask layer 72 is removed. FIG. 14 shows a state in which the mask layer 72 is removed. In this step, isotropic etching is performed until the adjacent recesses 13 in the X direction and the Y direction are connected to each other.

Figure 15:
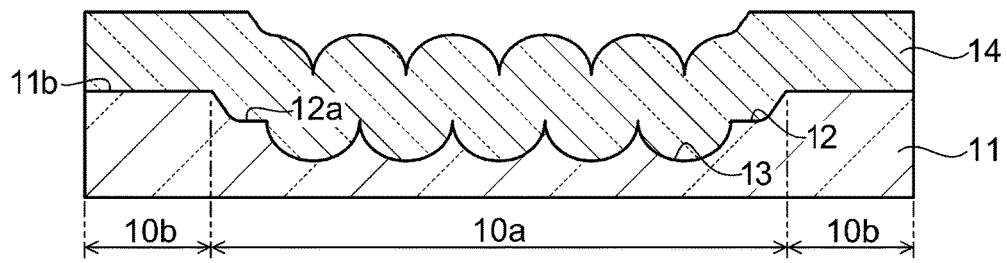
FIG. 15 is a schematic sectional view showing a method for manufacturing the element substrate.

Subsequently, as shown in FIG. 15, an inorganic material (for example, SiON) having light transmittance and having a refractive index larger than that of the substrate 11 is accumulated to form the lens layer 14 so as to cover the surface 11b side of the substrate 11 and fill the recesses 12 and 13. The lens layer 14 may be formed, for example, by a CVD method. At this time, in the state of the mother substrate 60, the lens layer 14 is formed so as to cover the entire surface of the mother substrate 60. The surface of the lens layer 14 formed by filling the recesses 12 and 13 has an uneven shape reflecting the unevenness caused by the recesses 12 and 13 of the substrate 11. The lens layer 14 may be formed in a single film formation or may be formed in the plurality of times of the film formation.

Figure 16:
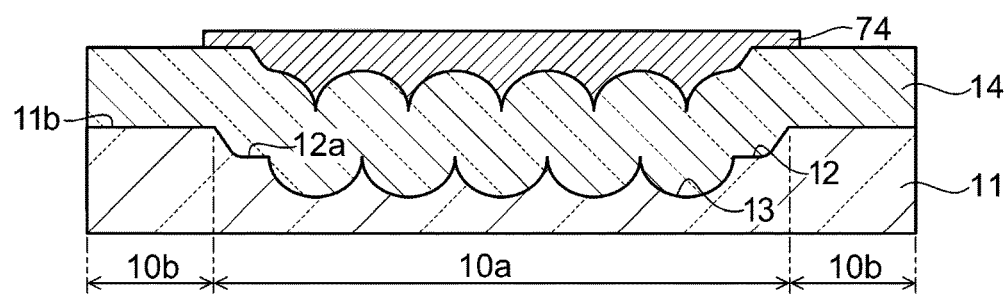
FIG. 16 is a schematic sectional view showing a method for manufacturing the element substrate.
Figure 17:
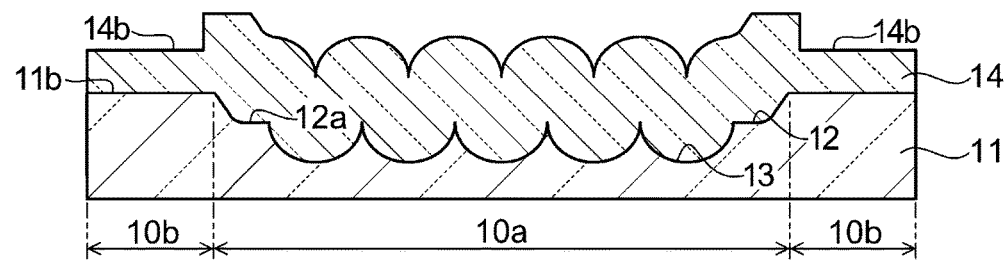
FIG. 17 is a schematic sectional view showing a method for manufacturing the element substrate.
Figure 18:
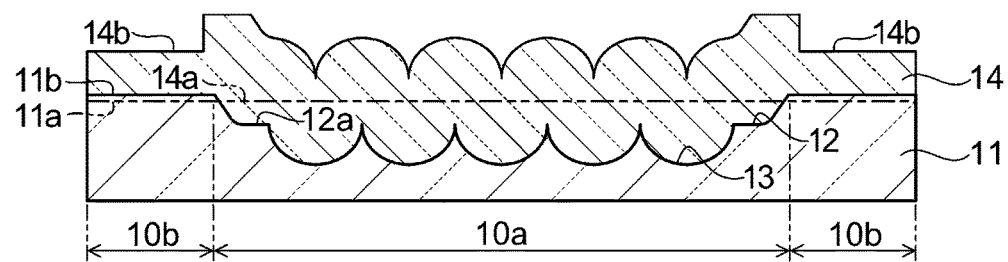
FIG. 18 is a schematic sectional view showing a method for manufacturing the element substrate.

In the flattening step shown in FIG. 18, the next step shown in FIGS. 16 and 17 is a step for correcting in advance the step difference (so-called global step difference) between the first region 10a where the recesses 12 and 13 are formed, and the second region 10b outside thereof. In the step shown in FIG. 16, a mask layer 74 is disposed in a region overlapping with the first region 10a on the lens layer 14. In the step shown in FIG. 17, a recess 14b is formed by etching the portion of the lens layer 14 which is not covered with the mask layer 74.

The size (area) of the mask layer 74 with respect to the first region 10a in the step shown in FIG. 16 or the etching amount (depth) of the recess 14b shown in FIG. 17 are appropriately set according to the size of the global step generated in a case where this correction is not performed.

Subsequently, as shown in FIG. 18, flattening processing is performed on the lens layer 14 formed in the first region 10a and the second region 10b on the substrate 11. In the flattening processing, for example, a portion where the unevenness of the lens layer 14 is formed is polished and removed by using a chemical mechanical polishing (CMP) process or the like.

In the embodiment, flattening processing is performed until the substrate 11 is exposed in the second region 10b. More specifically, after the surface 11b of the substrate 11 is exposed, the polishing is further advanced to a position below the surface 11b of the substrate 11 (for example, up to a level indicated by the two-dot chain line in FIG. 18). As a result, the lens layer 14 is polished in the first region 10a, and the lens layer 14 is removed in the second region 10b, whereby the substrate 11 is polished.

Figure 19:
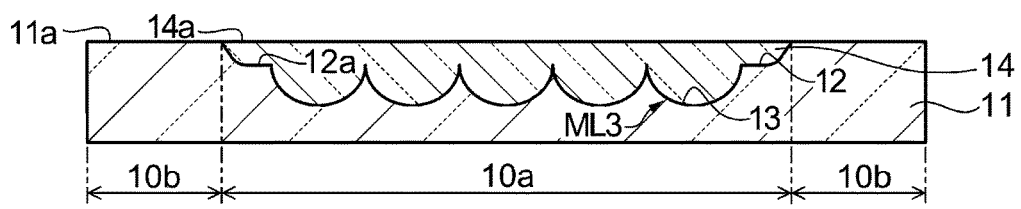
FIG. 19 is a schematic sectional view showing a method for manufacturing the element substrate.

As a result of the flattening processing, as shown in FIG. 19, the surface 14a of the lens layer 14 in the first region 10a and the surface 11a of the substrate 11 in the second region 10b are a continuous plane. That is, the lens layer 14 is disposed only in the first region 10a of the substrate 11 and is not disposed in the second region 10b outside the first region 10a. The microlens ML3 is configured by the portion that fills the recess 13 of the lens layer 14.

At this time, in the state of the mother substrate 60 shown in FIG. 10, the lens layer 14 is divided into units of the element substrate 10 and disposed in a state independent of the first region 10a of each of the element substrates 10. In the region other than the first region 10a including the second region 10b, the surface (the surface 11a of the substrate 11) of the mother substrate 60 is exposed.

Figure 20:
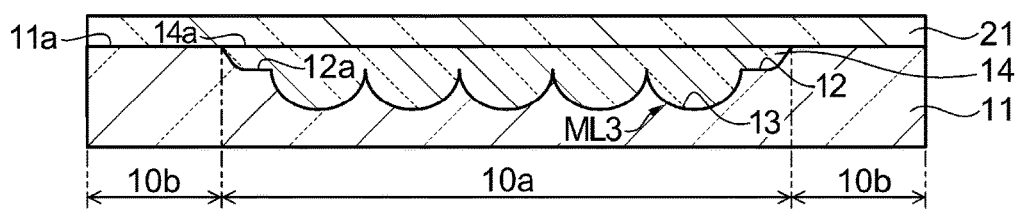
FIG. 20 is a schematic sectional view showing a method for manufacturing the element substrate.

Subsequently, as shown in FIG. 20, an inorganic material such as $SiO_2$ is accumulated over the first region 10a and the second region 10b on the substrate 11 to form the light transmitting layer 21. The light transmitting layer 21 is formed so as to cover the surface 11a of the substrate 11 and the surface 14a of the lens layer 14.

The subsequent steps will be omitted, but the light shielding layer 22 is formed on the light transmitting layer 21 to form the opening 22a for each pixel P, the light transmitting layer 21 and the light shielding layer 22 are covered to form the insulating layer 23, the TFT 24 is formed for each pixel P on the insulating layer 23, and the insulating layer 25 is formed to cover the insulating layer 23 and the TFT 24. Then, the light shielding layer 26 is formed on the insulating layer 25 to form the opening 26a for each pixel P, the insulating layer 25 and the light shielding layer 26 are covered to form the insulating layer 27, and the pixel electrode 28 is formed for each pixel P to cover the insulating layer 27 and the pixel electrode 28 to form the orientation film 29. The above steps are performed using known techniques. As described above, the element substrate 10 is completed.

Here, the effect of the manufacturing method for leaving only the portion that fills the recess 12 in the first region 10a by forming the recess 12 in the first region 10a of the substrate 11 and removing the portion of the lens layer 14 formed in the second region 10b on the substrate 11, which is a feature of the manufacturing method of the electrooptical device according to the embodiment, will be described.

In the step of manufacturing the element substrate 10, the substrate 11 and the lens layer 14 positioned on the lower layer side are exposed to a high temperature in the step of performing a heat treatment such as a semiconductor process for forming the TFT 24. When the lens layer 14 is formed on the entire surface of the substrate 11, that is, the entire surface of the mother substrate 60 shown in FIG. 10, the lens layer 14 having the thick portion filling the recess 12 and the plurality of the recesses 13 in the first region 10a, and the thin portion formed in the second region 10b is disposed in contact with the substrate 11 in the entire region of the mother substrate 60.

When such the mother substrate 60 and the lens layer 14 are exposed to a high temperature in a semiconductor process, stress is generated in the lens layer 14 due to a difference in thickness of the lens layer 14 in the plane of the mother substrate 60 or a difference in the thermal expansion coefficient between the mother substrate 60 and the lens layer 14, thus cracks and warpage may be generated in the lens layer 14. When the lens layer 14 is cracked or warped, the yield in the manufacturing step of the liquid crystal device 1 is reduced.

In the manufacturing step of the embodiment, the lens layer 14 is divided for each element substrate 10 and removed from the mother substrate 60 by leaving only the portion that fills the recess 12 and the plurality of recesses 13 in the first region 10a of the lens layer 14. Therefore, even if the mother substrate 60 and the lens layer 14 are exposed to a high temperature in the semiconductor process, the stress generated in the lens layer 14 is smaller compared with the case where the lens layer 14 is formed on the entire surface of the mother substrate 60. Therefore, it is possible to suppress generation of cracks and warpage in the lens layer 14 in a step of performing a heat treatment such as a semiconductor process. Thereby, the yield in the manufacturing step of the liquid crystal device 1 may be improved.

In the technique of the related art, as a method for suppressing cracks and warpage of the lens layer 14, there is also a method for reducing the lens diameter (the diameter of the recess 13) Φ of the microlens ML3 to be smaller than the arrangement pitch G (see FIG. 4) of the pixel P. That is, the lens layer 14 is divided for each pixel P by separating the adjacent microlenses ML3 (the recesses 13) in the X direction, the Y direction, and the diagonal direction.

However, in a case where the lens diameter (the diameter of the recess 13) Φ of the microlens ML3 is made smaller than the arrangement pitch G of the pixel P, as described above, the region Pa which does not overlap with the microlens ML3 occupying the region of the pixel P in a plan view is increased, and the outer peripheral end portion 13b of the microlens ML3 is disposed in the region of the pixel P over the entire circumference. Therefore, the oblique light increases due to light incident on the region Pa and not concentrated by the microlens ML3 (not bent back) or light bent near the outer peripheral end portion 13b of the microlens ML3 and greatly bent. In addition, stray light is likely generated by reflected light that is incident near the outer peripheral end portion 13b of the microlens ML3 and reflected. As a result, the utilization efficiency of light and the contrast of the projector are lowered.

In the manufacturing step of the embodiment, since the lens layer 14 is divided in a unit of the element substrate 10 unit, there is no need to divide the lens layer 14 for each pixel P unlike the case of the related art. That is, since adjacent microlenses ML3 (the recesses 13) may be connected to each other, it is possible to increase the lens diameter Φ of the microlens ML3 as compared with the case where the lens layer 14 is divided for each pixel P. Thereby, the liquid crystal device 1 capable of increasing the amount of light to be emitted and suppressing spread of light may be manufactured.

Next, a manufacturing method of the counter substrate 30 will be described with reference to FIGS. 21 to 30. FIGS. 21 to 30 are schematic cross section views showing a method for manufacturing the counter substrate. Each drawing of FIGS. 21 to 30 corresponds to a schematic sectional view taken along line A-A' of FIG. 1 and the vertical direction (Z direction) is reversed compared to that in FIG. 3. As for the counter substrate 30, as with the element substrate 10, processing is performed in a state of a large mother substrate capable of taking a plurality of the element substrates 10.

Figure 21:
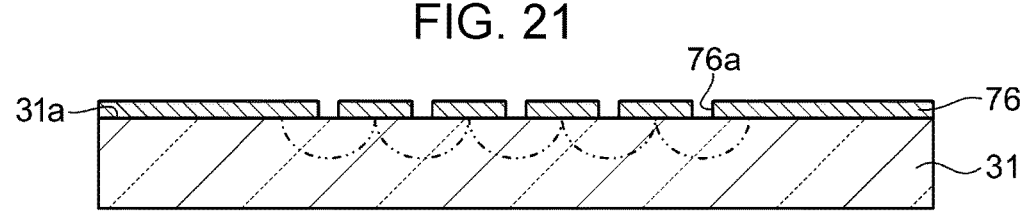
FIG. 21 is a schematic sectional view showing a method for manufacturing a counter substrate.

First, as shown in FIG. 21, a mask layer 76 is formed on the surface 31a of the substrate 31 having light transmittance made of quartz or the like. Then, the mask layer 76 is patterned to form a plurality of openings 76a in the mask layer 76. As a result, the surface 31a of the substrate 31 is exposed in the opening 76a. The planar center position of each opening 76a is the center in the formed recess 32.

Figure 22:
FIG. 22 is a schematic sectional view showing a method for manufacturing the counter substrate.

Subsequently, the substrate 31 is isotropically etched through the opening 76a of the mask layer 76. As a result, as shown in FIG. 22, the substrate 31 is etched through the opening 76a, and a plurality of the recesses 32 are formed. After completion of etching, the mask layer 76 is removed.

FIG. 22 shows a state in which the mask layer 76 is removed. In this step, as in the manufacturing step of the element substrate 10, it is preferable to perform isotropic etching until the adjacent recesses 32 in the X direction and the Y direction are connected to each other.

Figure 23:
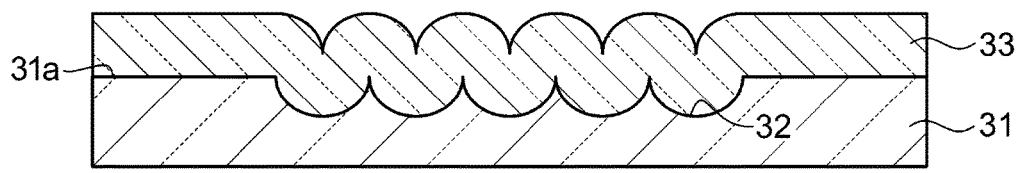
FIG. 23 is a schematic sectional view showing a method for manufacturing the counter substrate.

Subsequently, as shown in FIG. 23, an inorganic material (for example, SiON) having light transmittance and having a refractive index larger than that of the substrate 31 is accumulated to form the lens layer 33 so as to cover the surface 31a side of the substrate 31 and fill the recess 32. The lens layer 33 may be formed, for example, by a CVD method. Since the lens material layer is formed so as to fill the recesses 32, the surface of the lens layer 33 has an uneven shape obtained by reflecting unevenness caused by the recesses 32 of the substrate 31. The lens layer 33 may be formed in a single film formation or may be formed in the plurality of times of the film formation.

Figure 24:
FIG. 24 is a schematic sectional view showing a method for manufacturing the counter substrate.

Subsequently, as shown in FIG. 24, flattening processing is performed on the lens layer 33. In the flattening processing, for example, a portion where the unevenness of the upper layer of the lens layer 33 is formed is polished and removed by using a chemical mechanical polishing (CMP) process or the like. In this step, the flattening processing is ended in a state where the lens layer 33 remains on the surface 31a of the substrate 31. The microlens ML3 is configured by the portion that fills the recess 32 of the lens layer 33.

Figure 25:
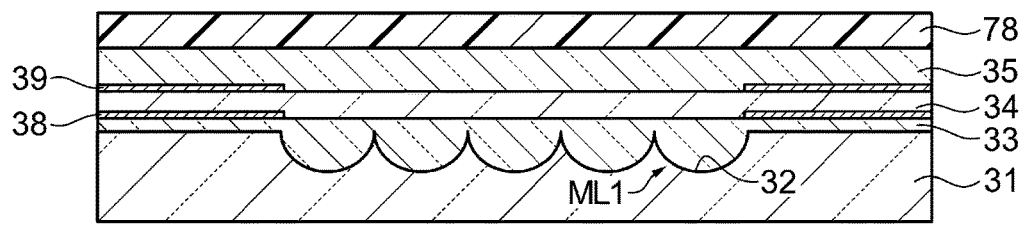
FIG. 25 is a schematic sectional view showing a method for manufacturing a counter substrate.

Subsequently, as shown in FIG. 25, after the light shielding layer 38 is formed on the lens layer 33, the intermediate layer 34 is formed of an inorganic material (for example, SiON) having light transmittance and having an optical refractive index substantially the same as that of the lens layer 35 formed thereon so as to cover the lens layer 33 and the light shielding layer 38. Then, after the light shielding layer 39 is formed on the intermediate layer 34, an inorganic material (for example, SiON) having light transmittance and having a refractive index larger than that of the substrate 31 is accumulated to form a lens layer 35 so as to cover the intermediate layer 34 and the light shielding layer 39. Further, a resist layer 78 is formed on the lens layer 35. The resist layer 78 is, for example, formed of a positive type photosensitive resist in which an exposure portion is removed by development. The resist layer 78 may be, for example, formed by a spin coating method or a roll coating method.

Figure 26:
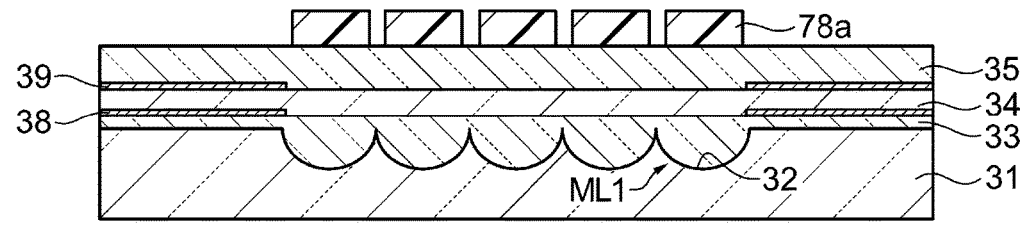
FIG. 26 is a schematic sectional view showing a method for manufacturing the counter substrate.

Subsequently, although not shown, the resist layer 78 is exposed and developed through a mask in which the light shielding portion is provided to correspond to the position of the recess 32. Thereby, as shown in FIG. 26, a region of the resist layer 78 other than the region overlapping with the light shielding portion of the mask is exposed and selectively removed, and a portion 78a corresponding to the position where the projection 36 is formed in a later step remains. Thus, the remaining portions 78a are separated from each other in the X direction, the Y direction, and the diagonal direction. The planar shape of the portion 78a is, for example, an approximately rectangular shape, and round four corners may be formed.

Figure 27:
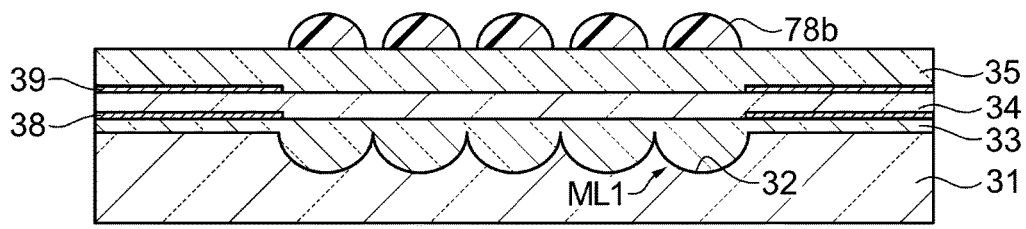
FIG. 27 is a schematic sectional view showing a method for manufacturing the counter substrate.

Subsequently, the remaining portion 78a of the resist layer 78 is softened (melted) by performing a heat treatment such as reflow treatment. The melted portion 78a is in a flow state and the surface is deformed in a curved surface shape due to the operation of surface tension. As a result, as shown in FIG. 27, a projection 78b having a curved surface shape is formed from the portion 78a remaining on the lens layer 35. The bottom side (the side of the lens layer 35) of the projection 78b has a approximately rectangular shape in a plan view, but the tip side (upper side) of the projection 78b is formed in a substantially concentric shape in a plan view.

Figure 28:
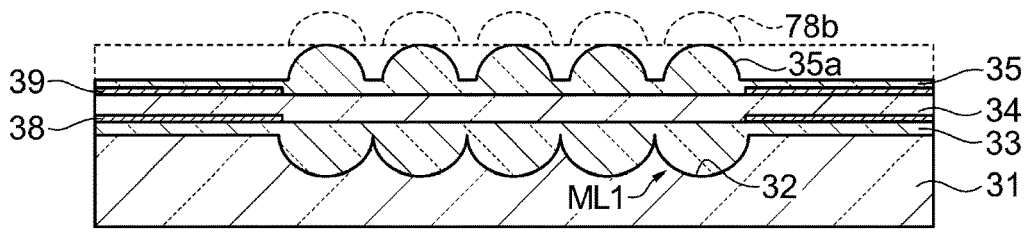
FIG. 28 is a schematic sectional view showing a method for manufacturing the counter substrate.

Subsequently, as shown in FIG. 28, anisotropic etching such as dry etching is applied to the projection 78b and the lens layer 35 from the upper side. As a result, the projection 78b formed of the resist is gradually removed, and the exposed portion of the lens layer 35 is etched along with removal of the projection 78b. As a result, on the surface side of the lens layer 35, the projection 35a reflecting the shape of the projection 78b is formed.

Figure 29:
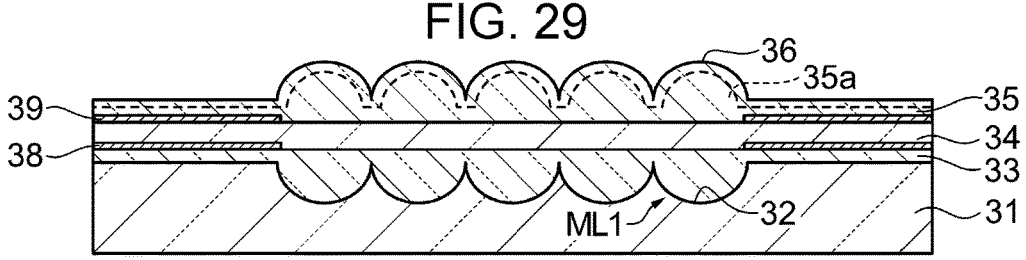
FIG. 29 is a schematic sectional view showing a method for manufacturing the counter substrate.

Subsequently, as shown in FIG. 29, the material of the lens layer 35 is accumulated so as to cover the intermediate layer 34 and the projection 35a. Thereby, the lens layer 35 including the projection 36 in which the shape of the projection 35a is enlarged is formed.

Figure 30:
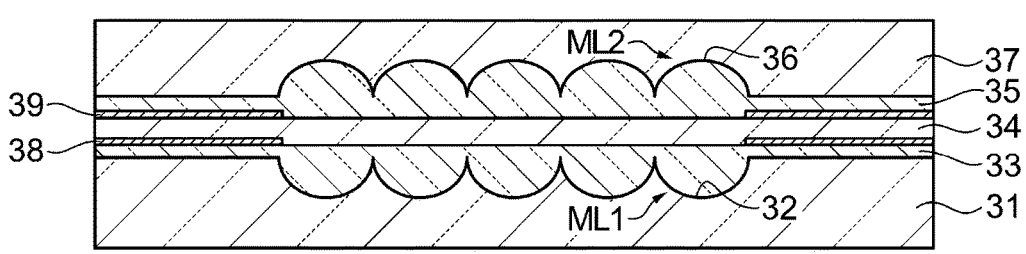
FIG. 30 is a schematic sectional view showing a method for manufacturing the counter substrate.

Subsequently, as shown in FIG. 30, an inorganic material having light transmittance and having a refractive index similar to that of the substrate 31, for example, is accumulated to form the light transmitting layer 37 so as to cover the lens layer 35. Then, flattening processing is applied to the light transmitting layer 37. The microlens ML2 is configured by covering the projection 36 with the light transmitting layer 37.

The subsequent steps will be omitted, but the protective layer 43, the common electrode 44, and the orientation film 45 are sequentially formed on the light transmitting layer 37 by using a known technique. Thus, the counter substrate 30 is completed.

A liquid crystal to be the liquid crystal layer 40 is disposed in the region surrounded by the sealing material 42 of one of the element substrate 10 and the counter substrate 30 processed in the state of the mother substrate and pasted together via the sealing material 42. Then, by cutting along the scribe lines SL1 and SL2 shown in FIG. 10 to form individual pieces, the plurality of liquid crystal devices 1 is obtained. Each of the element substrate 10 and the counter substrate 30 may be separated from the state of the mother substrate and bonded separately via the sealing material 42.

Second Embodiment

Electronic Apparatus

Figure 31:
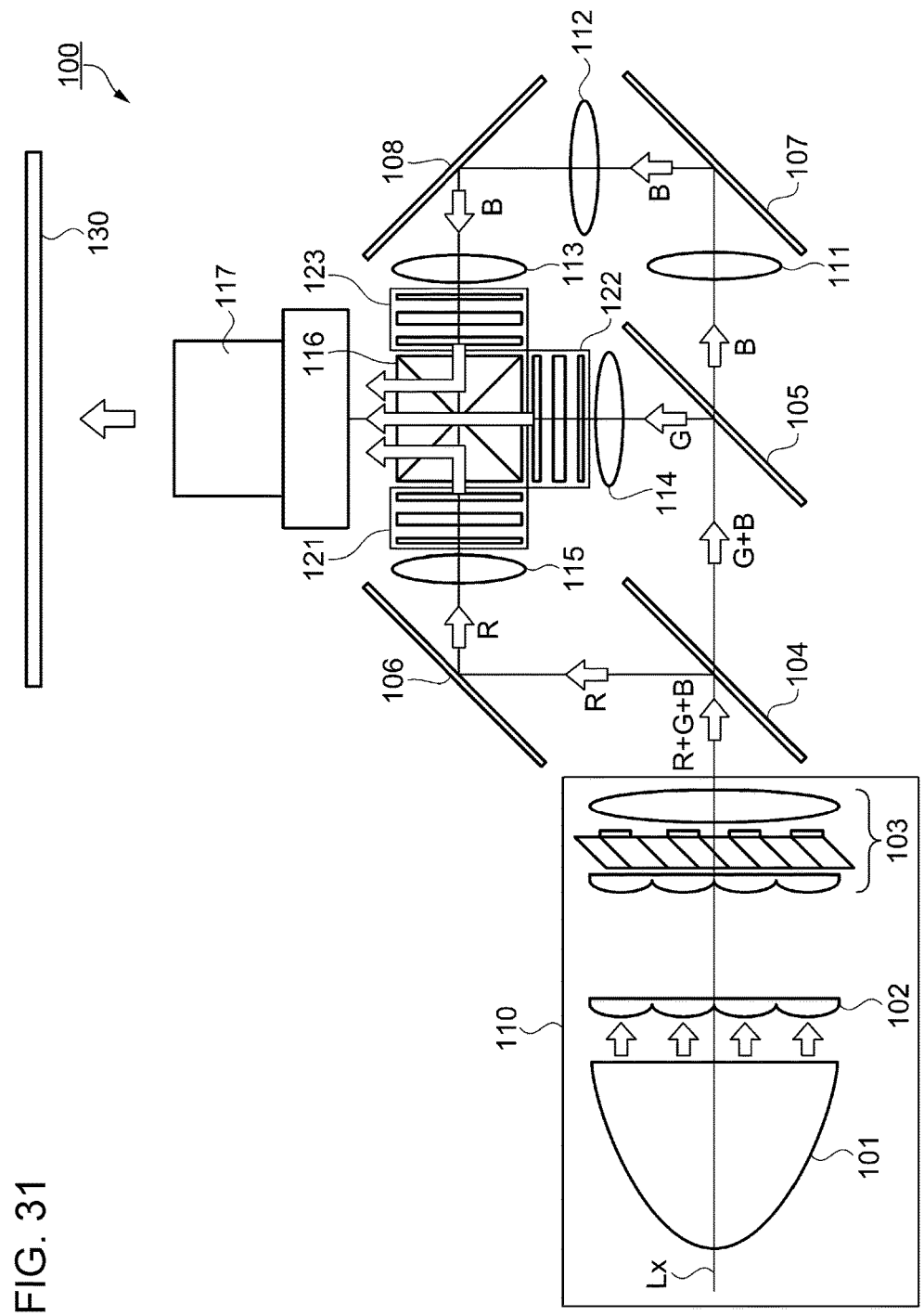
FIG. 31 is a schematic diagram showing a configuration of a projector as an electronic apparatus according to a second embodiment.

Next, the electronic apparatus according to a second embodiment will be described with reference to FIG. 31. FIG. 31 is a schematic view showing a configuration of a projector as the electronic apparatus according to the second embodiment.

As shown in FIG. 31, a projector (projection type display apparatus) 100 as the electronic apparatus according to the second embodiment includes a polarized light illumination device 110, two dichroic mirrors 104 and 105, three reflecting mirrors 106, 107, and 108, five relay lenses 111, 112, 113, 114, and 115, three liquid crystal light bulbs 121, 122, and 123, a cross dichroic prism 116, and a projection lens 117.

The polarized light illumination device 110, for example, includes a lamp unit 101 as a light source formed of white light source such as an ultra-high pressure mercury lamp or a halogen lamp, an integrator lens 102, and a polarization conversion element 103. The lamp unit 101, the integrator lens 102, and the polarization conversion element 103 are disposed along a system optical axis Lx.

The dichroic mirror 104 reflects red light (R) and transmits green light (G) and blue light (B) among polarized light beams emitted from the polarized light illumination device 110. The other dichroic mirror 105 reflects the green light (G) which is transmitted through the dichroic mirror 104 and transmits the blue light (B).

The red light (R) reflected by the dichroic mirror 104 is reflected by the reflecting mirror 106 and then is incident to the liquid crystal light bulb 121 through the relay lens 115. The green light (G) reflected by the dichroic mirror 105 is incident to the liquid crystal light bulb 122 through the relay lens 114. The blue light (B) which is transmitted through the dichroic mirror 105 is incident to the liquid crystal light bulb 123 through an optical guiding system configured with the three relay lenses 111, 112, and 113 and the two reflecting mirrors 107 and 108.

The transmission type liquid crystal light bulbs 121, 122, and 123 as optical modulation elements are respectively disposed to face surfaces of incidence of colored light beams of the cross dichroic prism 116. The colored light beams incident of the liquid crystal light bulbs 121, 122, and 123 are modulated based on moving image information (moving image signals) and emitted towards the cross dichroic prism 116.

The cross dichroic prism 116 is configured by bonding four rectangular prisms to each other, and in the inner surfaces thereof, a dielectric multilayer film reflecting red light and a dielectric multilayer film reflecting blue light are formed in a cross shape. Three colored light beams are synthesized by these dielectric multilayer film, and light displaying a color image is synthesized. The synthesized light is projected on a screen 130 by the projection lens 117 which is a projection optical system and an enlarged image is displayed.

The liquid crystal light bulb 121 is disposed between a pair of polarization elements disposed in a crossed Nichol prism with a gap therebetween at an incidence side and an emission side of the colored light. The same applies to the other liquid crystal light bulbs 122 and 123. The liquid crystal light bulbs 121, 122, and 123 are those to which the liquid crystal device 1 according to the first embodiment is applied.

According to the configuration of the projector 100 according to the second embodiment, even if a plurality of pixels P are disposed with high definition, since the liquid crystal device bulbs 121, 122, and 123 are provided with the liquid crystal device 1 which has high utilization efficiency of incident light from the light source and suppresses spread of emitted light, it is possible to provide the projector 100 having a bright display and a high contrast.

The embodiments described above are merely aspects of the invention, and therefore, arbitrary modifications and application may be performed within the scope of the invention. The followings are, for example, considered as modification examples.

Modification Example 1

In the liquid crystal device 1 according to the first embodiment, the lens surfaces of the microlenses ML1, ML2, and ML3 have a curved surface such as a semicircle or a semiellipse, but the invention is not limited to such a configuration. At least one lens surface of the microlens ML1, ML2, and ML3 may have a flat portion at the center. When the lens surface of microlens includes a flat portion at the center, light incident on the flat portion along the normal direction is transmitted through the microlens without being refracted. Therefore, in a case where parallel light is incident on the liquid crystal device 1, since the parallel light contained in the light emitted from the liquid crystal device 1 increases, the contrast in the projector may be further improved.

Modification Example 2

In the liquid crystal device 1 according to the first embodiment, in the counter substrate 30, the light shielding layer 38 is provided on the lens layer 33 and the light shielding layer 39 is provided on the intermediate layer 34, but the invention is not limited to such a configuration. For example, either the light shielding layer 38 or the light shielding layer 39 may be provided, or a configuration in which one of the light shielding layers is provided on the light transmitting layer 37 may be adopted.

Modification Example 3

In the liquid crystal device 1 according to the first embodiment, in the counter substrate 30, the intermediate layer 34 is formed of an inorganic material (SiON) having substantially the same optical refractive index as the lens layer 35, but the invention is not limited to such an embodiment. The intermediate layer 34 may be formed of an inorganic material (SiON) having substantially the same optical refractive index as the lens layer 33, or an inorganic material ($SiO_2$) having substantially the same optical refractive index as the substrate 31.

Modification Example 4

The electronic apparatus to which the liquid crystal device 1 according to the first embodiment may be applied is not limited to the projector 100. The liquid crystal device 1 may be, for example, suitably used as a projection type head-up display (HUD) or a direct viewing type head mount display (HMD), a display unit of an electronic book, a personal computer, a digital still camera, a liquid crystal television, a view finder type video camera, a car navigation system, an electronic notebook, or an information terminal device such as a POS.

Application No. 2016-245135, filed Dec. 19, 2016 is expressly incorporated by reference herein.

What is claimed is:
1. An electrooptical device comprising:
a first substrate and a second substrate on which a plurality of pixels are disposed; and
an electrooptical layer that is sandwiched therebetween,
wherein light is incident on the electrooptical layer from the first substrate,
wherein the first substrate includes
a first lens layer that has a first microlens disposed on a first base material for each of the pixels, and
a second lens layer that has a second microlens disposed for each of the pixels on the electrooptical layer side of the first lens layer,
wherein the second substrate includes
a third lens layer that has a third microlens disposed on a second base material for each of the pixels,
a switching element that is provided on the electrooptical layer side of the third lens layer for each of the pixels, and
a light shielding portion that has an opening for each of the pixels and is provided on the electrooptical layer side of the switching element so as to overlap with the switching element in a plan view, wherein the third lens layer is provided so as to fill a first recess formed in a first region in which the plurality of pixels on one surface of the second substrate on the electrooptical layer side are disposed and a second recess constituting a lens surface of the third microlens formed at a bottom of the first recess, and wherein the surface on the one surface side of the third lens layer constitutes a plane continuous with the one surface in the second region disposed outside the first region of the second base material.

2. The electrooptical device according to claim 1, wherein a refractive index of the third lens layer is larger than a refractive index of the second base material and smaller than refractive indices of the first lens layer and the second lens layer.

3. The electrooptical device according to claim 2, wherein the refractive index of the third lens layer is 1.51 or more and 1.60 or less and the refractive index of the first lens layer and the second lens layer is 1.55 or more and 1.70 or less.

4. The electrooptical device according to claim 1, wherein at least a part of the third microlenses is in contact with the adjacent third microlenses.

5. The electrooptical device according to claim 4, wherein a lens diameter of the third microlens is 85% or more and 110% or less of a length of a diagonal line of the pixel.

6. An electronic apparatus comprising:
the electrooptical device according to claim 1.

7. An electronic apparatus comprising:
the electrooptical device according to claim 2.

8. An electronic apparatus comprising:
the electrooptical device according to claim 3.

9. An electronic apparatus comprising:
the electrooptical device according to claim 4.

10. An electronic apparatus comprising:
the electrooptical device according to claim 5.

11. A method for manufacturing an electrooptical device which includes a first substrate and a second substrate on which a plurality of pixels are disposed and an electrooptical layer sandwiched therebetween, and in which light is incident on the electrooptical layer from the first substrate, the method comprising:

forming a recess on one surface of a first base material of the first substrate for each of the pixels;

forming a first lens layer so as to cover the one surface of the first base material to fill the recess;

flattening a surface of the first lens layer;

forming a second lens layer on the first lens layer;

forming a projection for each of the pixels by selectively removing a surface of the second lens layer;

forming a first recess in a first region in which the plurality of pixels on one surface of the second base material of the second substrate are disposed;

forming a second recess at a bottom of the first recess for each of the pixels;

forming a third lens layer so as to cover the one surface of the second base material to fill the first recess and the second recess;

flattening a surface of the third lens layer in the first region and a surface of the second base material in the second region to be a continuous plane by removing the surface of the third lens layer until the second base material is exposed in a second region disposed outside the first region;

forming a switching element on the third lens layer for each of the pixels;

forming a light shielding portion having an opening for each of the pixels on the switching element and provided so as to overlap with the switching element in a plan view; and bonding a surface of the first substrate on which the second lens layer is formed and a surface of the second substrate on which the light shielding portion is formed with the electrooptical layer interposed therebetween.

12. An electrooptical device comprising:

a first substrate and a second substrate on which a pixel is disposed; and an electrooptical layer that is disposed between the first substrate and the second substrate, wherein the first substrate includes
a first lens layer that has a first microlens disposed on a first base material for the pixel, and
a second lens layer that has a second microlens disposed for the pixel on the electrooptical layer side of the first lens layer, wherein the second substrate includes
a third lens layer that has a third microlens disposed on a second base material for the pixel,
a switching element that is provided on the electrooptical layer side of the third lens layer for the pixel, and
a light shielding portion that has an opening for the pixel and is provided on the electrooptical layer side of the switching element so as to overlap with the switching element in plan view, wherein a refractive index of the third lens layer is larger than a refractive index of the second base material and smaller than refractive indices of the first lens layer and the second lens layer.

* * * * *